(12) United States Patent
Monden

(10) Patent No.: US 7,831,071 B2
(45) Date of Patent: Nov. 9, 2010

(54) IMAGE PROCESSING SYSTEM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 962 days.

(21) Appl. No.: 11/632,930

(22) PCT Filed: Jul. 22, 2005

(86) PCT No.: PCT/JP2005/013890

§ 371 (c)(1),
(2), (4) Date: Jan. 19, 2007

(87) PCT Pub. No.: WO2006/009319

PCT Pub. Date: Jan. 26, 2006

(65) Prior Publication Data

US 2007/0297655 A1 Dec. 27, 2007

(30) Foreign Application Priority Data

Jul. 22, 2004 (JP) .............................. 2004-214919

(51) Int. Cl.
*G06K 9/00* (2006.01)
(52) U.S. Cl. ..................... 382/124; 340/5.53; 340/5.83; 382/205; 382/207; 713/186
(58) Field of Classification Search ......... 382/115–127, 382/205, 207; 340/5.1, 5.2, 5.52, 5.53, 5.8–5.86; 356/71; 713/186; 902/3
See application file for complete search history.

(56) References Cited

U.S. PATENT DOCUMENTS

| | | | | |
|---|---|---|---|---|
| 3,779,492 A | * | 12/1973 | Grumet | 244/3.17 |
| 3,836,712 A | * | 9/1974 | Kornreich et al. | 348/207.99 |
| 5,426,708 A | * | 6/1995 | Hamada et al. | 382/125 |
| 5,859,920 A | * | 1/1999 | Daly et al. | 382/115 |
| 5,937,082 A | | 8/1999 | Funada | |
| 5,953,442 A | | 9/1999 | Dydyk et al. | |
| 6,226,391 B1 | | 5/2001 | Dydyk et al. | |
| 6,289,114 B1 | | 9/2001 | Mainguet | |
| 6,947,600 B1 | | 9/2005 | Sato et al. | |
| 6,961,451 B2 | | 11/2005 | Funada | |
| 7,027,626 B2 | | 4/2006 | Funada | |

(Continued)

FOREIGN PATENT DOCUMENTS

EP 0780 780 A2 6/1997

(Continued)

OTHER PUBLICATIONS

P. Duhamel et al., "Fast Fourier Transforms: A tutorial review and a state of the art," Signal Processing, Elsevier Science Publishers B.V. Amsterdam, NL, vol. 19:4, Apr. 1, 1990, pp. 259-299.

*Primary Examiner*—Aaron W Carter
(74) *Attorney, Agent, or Firm*—Foley & Lardner LLP

(57) ABSTRACT

In order to start a frequency analysis process before completion of acquisition of an image so as to shorten a processing time, a first frequency analysis unit performs one-dimensional frequency analysis on each pixel line. A second frequency analysis unit collects a predetermined number of one-dimensional frequency analysis results from the first frequency analysis unit and performs further one-dimensional frequency analysis so as to obtain a final two-dimensional frequency analysis result.

22 Claims, 15 Drawing Sheets

U.S. PATENT DOCUMENTS

| | | |
|---|---|---|
| 7,079,685 B1 | 7/2006 | Hirota et al. |
| 2002/0164055 A1 | 11/2002 | Funada |
| 2002/0164056 A1 | 11/2002 | Funada |
| 2002/0191632 A1 | 12/2002 | McDermott |
| 2003/0076984 A1* | 4/2003 | Tisse et al. .................. 382/117 |
| 2003/0179909 A1* | 9/2003 | Wong et al. .................. 382/115 |
| 2007/0189586 A1* | 8/2007 | Monden ..................... 382/124 |
| 2007/0297655 A1* | 12/2007 | Monden ..................... 382/125 |

FOREIGN PATENT DOCUMENTS

| | | |
|---|---|---|
| JP | 59-022173 | 2/1984 |
| JP | 60-59473 (A) | 4/1985 |
| JP | 07-271763 | 10/1995 |
| JP | 08-131419 | 5/1996 |
| JP | 9-147113 A | 6/1997 |
| JP | 09-167230 | 6/1997 |
| JP | 09-214967 | 8/1997 |
| JP | 10-091769 | 4/1998 |
| JP | 11-266373 A | 9/1999 |
| JP | 2001-136526 A | 5/2001 |
| JP | 2001-511569 A | 8/2001 |
| JP | 2002-099912 A | 4/2002 |
| JP | 2002-288641 A | 10/2002 |
| JP | 2002-288672 A | 10/2002 |
| JP | 2003-295990 A | 10/2003 |
| JP | 2003-331337 A | 11/2003 |
| JP | 2004-61292 A | 2/2004 |
| WO | WO 02/08850 A2 | 1/2002 |

\* cited by examiner

IMAGE PROCESSING SYSTEM

TECHNICAL FIELD

The present invention relates to an image processing system, an image processing method, and an image processing software program, and more particularly to an image processing system, an image processing method, and an image processing software program for performing frequency analysis on an input image.

BACKGROUND ART

When an image such as fingerprint ridge lines is viewed in a small area, it can be considered as lines periodically spaced at equal intervals. Accordingly, such an image is divided into small regions, which can be regarded as periodic patterns, and frequency analysis such as Fourier transform is performed on each small region for coding or image enhancement.

There has heretofore been proposed a fingerprint/palmprint image processing system for performing frequency analysis on a fingerprint or a palmprint (hereinafter referred to as a fingerprint/palmprint).

For example, Japanese Unexamined Patent Publication No. 59-22173 (hereinafter referred to as Patent Document 1) discloses a "Fingerprint Image Coding Method" which reduces loads on pre-processing and post-processing for coding and facilitates fingerprint image coding. In the fingerprint image coding method disclosed by Patent Document 1, an entire fingerprint image is divided into small regions, Fourier transform is performed on each small region, and Fourier components of the small regions are coded so that the fingerprint image is coded.

Further, Japanese Unexamined Patent Publication No. 2002-99912 (hereinafter referred to as Patent Document 2) discloses an "Image Processing Apparatus" which removes noise from an input image such as a fingerprint image so as to improve image quality. In the image processing apparatus disclosed by Patent Document 2, block division means divides an input image into blocks, and Fourier transform means performs Fourier transform on an image of each block. Noise power reduction means estimates a power of the original image and a power of noise at respective frequencies, sets a gain to be smaller as relative sizes of these powers are larger, and multiplies an amplitude of Fourier component information at the corresponding frequency by the gain to thereby reduce noise power. Inverse Fourier transform means performs inverse Fourier transform on the Fourier component changed in amplitude, and image reconstruction means reads respective block images that have been subjected to the inverse Fourier transform altogether so as to restore the entire image. Specifically, in the image processing apparatus disclosed by Patent Document 2, an entire fingerprint image is divided into small regions, and Fourier transform is performed on each small region. Components representing ridge lines are selected from a power of the Fourier components in each region. The fingerprint image is reconstructed with use of the components selected in each region.

Japanese Unexamined Patent Publication No. 9-167230 (corresponding to U.S. Pat. No. 5,937,082) (hereinafter referred to as Patent Document 3) discloses a "Fingerprint/palmprint Image Processing Apparatus" which extracts a ridge line image accurately from a skin pattern image even if there are wrinkles having characteristics similar to those of ridge lines. In the fingerprint/palmprint image processing apparatus disclosed by Patent Document 3, a local information extracting unit extracts a plurality of ridge line candidate images from each of local regions into which an input image is divided. A first ridge line candidate image selecting unit selects a first ridge line candidate image that is a ridge line candidate image having a maximum likelihood of a ridge line from ridge line candidate images in each of the local regions. A connectivity evaluating unit evaluates a connectivity of the first ridge line candidate images between adjacent local regions, and local regions that have been evaluated to have a high connectivity therebetween are integrated by a clustering unit so as to generate a local region group. A cluster evaluating unit determines an initial local region group that is a local region group having a high likelihood of a ridge line. An optimum ridge line candidate image selecting unit selects a ridge line candidate image having a high connectivity with its surrounding from the ridge line candidate images in local regions that are not included in the initial local region group. A ridge line image restoring unit produces the ridge line candidate image with respect to the local regions included in the initial local region group and otherwise produces the optimum ridge line candidate image as a ridge line extraction result and results in using them as a ridge extract results.

Japanese Unexamined Patent Publication No. 2002-288641 (corresponding to U.S. Patent Application Publication No. 2002/0164056) (hereinafter referred to as Patent Document 4) discloses a "Fingerprint/palmprint Image Processing Apparatus" which can extract a ridge line more accurately even in a region in which wrinkles are mixed or at a portion in which the ridge line has a high curvature. In the fingerprint/palmprint image processing apparatus disclosed by Patent Document 4, a ridge line image that is supposed to show a ridge line is selected from ridge line candidate images in local regions other than highly reliable regions, and it is determined whether each selected ridge line image is effective as an image representing a ridge line. An entire image is generated based on the ridge line images in the highly reliable regions and the ridge line images that are determined as being effective in other regions.

Japanese unexamined Patent Publication No. 2002-288672 (corresponding to U.S. Patent Application Publication No. 2002/0164055) (hereinafter referred to as Patent Document 5) discloses a "Fingerprint/palmprint Image Processing Apparatus" which can extract a ridge line more accurately even in a region in which wrinkles are mixed or at a portion in which the ridge line has a high curvature. In the fingerprint/palmprint image processing apparatus disclosed by Patent Document 5, region feature judging means judges a region in which ridge lines singly exist or a region in which wrinkles and ridge lines are mixed. Suitable ridge line candidate selecting means selects images representing ridge lines from ridge line candidate images for the region in which wrinkles and ridge lines are mixed and for the region in which ridge lines singly exist, based on corresponding evaluation standards.

Specifically, in the fingerprint/palmprint image processing apparatus disclosed by Patent Document 3 to Patent Document 5, an entire fingerprint image is divided into small regions, and Fourier transform is performed on each small region. Components representing ridge lines are selected in each region based on the connectivity with Fourier components in adjacent regions. A fingerprint image is reconstructed with use of the components selected in each region.

However, in the fingerprint/palmprint image processing apparatus disclosed by Patent Document 1 to Patent Document 5, since two-dimensional Fourier transform is performed collectively on vertical and horizontal pixel values of small regions into which the entire fingerprint image is divided, the Fourier transform process cannot be started in a state such that input of the entire fingerprint image or the entire small region image has not been completed. As a result, it is inconvenient that an overall period of time required for the Fourier transform process becomes long because of a standby time for image input or the like.

A fingerprint image has heretofore been captured at a time with use of a sensor larger than a finger. In contrast thereto, there is a method to achieve a lower cost and a reduced size of an apparatus, which uses a sensor smaller than a finger and moves the finger and the sensor relative to each other (referred to as sweep operation) so as to acquire an entire image of the finger. For example, Japanese Unexamined Patent Publication No. 10-91769 (corresponding to U.S. Pat. No. 6,289,114) (hereinafter referred to as Patent Document 6) discloses a "Fingerprint Reading System" which can recognize and determine the best image with sufficient accuracy and high reliability at low cost. The fingerprint reading system disclosed by Patent Document 6 has reading means for reading a fingerprint while a sensor attached to the reading means and a finger are slid so as to provide relative movement therebetween in a state such that the finger is brought into contact with the sensor, and means for reconstructing an image of the fingerprint from partial images obtained during the movement.

However, in a case where a fingerprint image is to be inputted with use of such a sensor, since the fingerprint/palmprint image processing apparatus of Patent Document 1 to Patent Document 5 has a structure in which two-dimensional Fourier transform is performed collectively on vertical and horizontal pixel values, it is necessary to form an image of the entire fingerprint or the entire small region in advance with application of technology disclosed by Patent Document 6 in order to start the two-dimensional Fourier transform. As a result, there are problems that a period of time required for the process becomes redundant and that input means has a limitation in structure.

Further, Fourier transform should be performed on a sufficiently large area such that the periodicity of ridge lines is clearly recognized in each region. However, because coding or image enhancement is performed on each small region, the coding or image enhancement cannot fully be performed if the size of a small region is made larger, thereby causing an adverse influence. Accordingly, it is desirable that a small region is not made larger than necessary and that Fourier transform is performed on a wide area around the small region so as to guarantee the fineness of coding or image enhancement and improve the stability of the frequency analysis.

For example, in the embodiment disclosed by Patent Document 3, in order to calculate a frequency component of a small region of 8-pixel square, Fourier transform is performed on an image of 64-pixel square around the small region. However, in this case, an area to be subjected to Fourier transform becomes large. Particularly in a case where small regions are successively extracted so that a frequency component of each small region is calculated, two-dimensional Fourier transform should be performed on an image of 64-pixel square for each small region, so that a period of time required for arithmetic processing becomes extremely redundant.

In this manner, the technical idea that Fourier transform is performed on a wide area around a small region so as to guarantee the fineness of coding or image enhancement and improve the stability of a frequency analysis can be diverted not only to the fingerprint/palmprint image processing apparatus disclosed by Patent Document 3, but also, for example, to any fingerprint/palmprint image processing apparatus disclosed by Patent Documents 1, 2, and 3 to 5. However, the redundancy of a standby time for image input or a period of time required for arithmetic processing causes a bottleneck.

Further, Japanese Unexamined Patent Application Publication (Translation of PCT Application) No. 2001-511569 (corresponding to U.S. Pat. No. 5,953,442) (hereinafter referred to as Patent Document 7) discloses a method and an apparatus for automatically positioning a first unknown image such as an unknown fingerprint image into one of a plurality of categories. The invention disclosed by Patent Document 7 includes a step of storing a set of plural values derived from frequency images of the respective image categories into a library. A categorization method and apparatus take a frequency image of a first unknown pattern to create a first frequency image. A frequency image plane of the first (unknown) frequency image is divided into a plurality of frequency image plane regions. Each of the frequency image plane regions may be an angular segment radiating from the origin of the frequency image plane. A region value is assigned to each of the frequency image plane regions based on a total energy of the frequency image in the angular frequency image plane region. The region values for the first frequency image are combined to generate a first set of region values. The first set of region values is compared with each of the stored set of values in a comparator. The comparator preferably correlates the set or pattern of the region values with use of one-dimensional frequency transform on a spatial image of the pattern of the region value set.

In Patent Document 7, two-dimensional Fourier transform is performed collectively on pixel values of the fingerprint image. Accordingly, the method and apparatus disclosed by Patent Document 7 also have the same problems as the aforementioned fingerprint/palmprint image processing apparatus disclosed by Patent Document 1 to Patent Document 5.

Accordingly, an object of the present invention is to provide an image processing system, an image processing method, and an image processing program capable of reducing an overall processing time required for a frequency analysis-process.

DISCLOSURE OF INVENTION

An image processing system according to a first aspect of the present invention is an image processing system for dividing an original image into small regions and for performing frequency analysis on each small region. In order to attain the above object, particularly, the image processing system is characterized by comprising an image input device for acquiring an original image partially in sequence, a first frequency analysis unit for dividing the partially acquired image into pixel lines and for performing one-dimensional frequency analysis on each pixel line, and a second frequency analysis unit for collecting the one-dimensional frequency analysis results required for analysis of a small region, which have been obtained by the first frequency analysis unit, and for obtaining a two-dimensional frequency analysis result of the small region.

With the above configuration, the image input device such as a fingerprint/palmprint sensor acquires an image such as a fingerprint or a palmprint partially in sequence. The first frequency analysis unit divides the partially acquired image into pixel lines and performs one-dimensional frequency analysis on each pixel line so as to obtain one-dimensional frequency analysis results.

Accordingly, the first frequency analysis unit can start one-dimensional frequency analysis when at least one pixel line is acquired by the image input device. Thus, a standby time for image input is shortened.

The first frequency analysis unit repeatedly performs one-dimensional frequency analysis on a new image (at least one pixel line) partially acquired by the image input device so as to sequentially obtain one-dimensional frequency analysis results until a required number of the one-dimensional frequency analysis results for analysis of the small region have been acquired.

After a required number of the one-dimensional frequency analysis results for analysis of the small region have been acquired, the second frequency analysis unit collects the one-dimensional frequency analysis results and obtains a two-dimensional frequency analysis result of the small region based on these one-dimensional frequency analysis results.

Thus, the first frequency analysis unit shortens a standby time until start of the one-dimensional frequency analysis. The first frequency analysis unit obtains a required number of the one-dimensional frequency analysis results for analysis of the small region in advance approximately concurrently with acquisition of the image. The second frequency analysis unit obtains a two-dimensional frequency analysis result of the small region based on these one-dimensional frequency analysis results. Accordingly, it is possible to reduce a load on a process in the first and second frequency analysis units and hence achieve a reduction of an overall processing time required for a frequency analysis process.

An image processing system according to a second aspect of the present invention comprises an image input device for acquiring an original image partially in sequence and for dividing the partially acquired image into pixel lines, a first frequency analysis unit for performing one-dimensional frequency analysis on each pixel line, and a second frequency analysis unit for collecting the one-dimensional frequency analysis results required for analysis of a small region, which have been obtained by the first frequency analysis unit, and for obtaining a two-dimensional frequency analysis result.

The entire configuration is substantially the same as described above except that a function of dividing the partially acquired image into pixel lines is provided in the image input device rather than the first frequency analysis unit.

An image processing system according to a third aspect of the present invention comprises an image input device with a first frequency analysis unit for acquiring an original image partially in sequence, dividing the partially acquired image into pixel lines, and performing one-dimensional frequency analysis on each pixel line, and a second frequency analysis unit for collecting the one-dimensional frequency analysis results required for analysis of a small region, which have been obtained by the first frequency analysis unit, and for obtaining a two-dimensional frequency analysis result of the small region.

The entire configuration is substantially the same as described above except that a function of dividing the partially acquired image into pixel lines and a function of the first frequency analysis unit for performing one-dimensional frequency analysis on each pixel line are provided in the image input device.

More specifically, the first frequency analysis unit can be configured to perform one-dimensional Fourier transform on each pixel line. Further, the second frequency analysis unit can be configured to collect one-dimensional Fourier transform results obtained by the first frequency analysis unit and to perform further one-dimensional Fourier transform so as to obtain a two-dimensional Fourier transform result of the original image.

As with the aforementioned case, the first frequency analysis unit shortens a standby time until start of the one-dimensional Fourier transform. The first frequency analysis unit obtains a required number of the one-dimensional Fourier transform results for analysis of the small region in advance. The second frequency analysis unit collects these one-dimensional Fourier transform results and performs further one-dimensional Fourier transform so as to obtain a two-dimensional Fourier transform result of the original image. Accordingly, it is possible to reduce a load on a process in the first and second frequency analysis units and hence achieve a reduction of an overall processing time required for a two-dimensional Fourier transform process.

Further, particularly in a case where small regions are successively extracted in a repeated manner so that a frequency component of each small region is calculated on the assumption that frequency analysis is performed on a wider area including the small region, frequency analysis results that have previously been obtained by the first frequency analysis unit are repeatedly used in two-dimensional frequency analysis for a second or further time by the second frequency analysis unit. It is possible to omit calculation for one-dimensional frequency analysis of overlapped pixel lines and to enhance a processing speed.

In the case where small regions are successively extracted in a repeated manner on the assumption that frequency analysis is performed on a wider area including the small region, an overlapped portion of frequency analysis results that have been obtained in the last or further preceding process by the first frequency analysis unit can directly be utilized. Accordingly, the number of processing required for the first frequency analysis unit to perform two-dimensional frequency analysis for a second or further time is reduced. Thus, it is possible to achieve a remarkable reduction of an overall processing time required for a frequency analysis process.

This image processing system can be used as an image processing system for acquiring an image of a fingerprint or a palmprint from an image input device, i.e., a fingerprint/palmprint image processing system. In this case, it is possible to provide a fingerprint/palmprint image processing system having an excellent processing speed.

Further, this image processing system may be used as a fingerprint/palmprint image processing system for detecting the vicinity of a feature point in a fingerprint or a palmprint from a frequency analysis result and for restoring only ridge lines near the feature point. In this case, it is possible to provide a fingerprint/palmprint image processing system capable of restoring ridge lines near the feature point in a short period of time.

Furthermore, a microprocessor dedicated for signal processing may be used in the first frequency analysis unit, or the second frequency analysis unit, or the first and second frequency analysis units to perform frequency analysis, thereby enhancing a processing speed.

Particularly, when each of the first and second frequency analysis units is formed by a microprocessor dedicated for signal processing, some of processes, such as acquisition, division, one-dimensional frequency analysis, and two-dimensional frequency analysis of an image, can be executed concurrently with each other. It is possible to enhance an overall processing speed.

An image processing method according to a first aspect of the present invention is an image processing method of dividing an original image into small regions and of performing frequency analysis on each small region. In order to attain the above object, particularly, the image processing method is characterized by performing an image input process of acquiring an original image partially in sequence, a first frequency analysis process of dividing the partially acquired image into pixel lines and of performing one-dimensional frequency analysis on each pixel line, a second frequency analysis process of collecting the one-dimensional frequency analysis results required for analysis of a small region, which have been obtained by the first frequency analysis process, and of obtaining a two-dimensional frequency analysis result of the small region so as to perform frequency analysis of the image.

As soon as an original image is partially acquired and divided into pixel lines, one-dimensional frequency analysis can be started so as to shorten a standby time. A required number of the one-dimensional frequency analysis results for analysis of the small region are obtained in advance approximately concurrently with acquisition of the image. A two-dimensional frequency analysis result of the small region is obtained based on these one-dimensional frequency analysis results. Accordingly, it is possible to reduce a load on a process and hence to achieve a reduction of an overall processing time required for a frequency analysis process.

An image processing method according to a second aspect of the present invention includes an image input process of acquiring an original image partially in sequence and of dividing the partially acquired image into pixel lines, a first frequency analysis process of performing one-dimensional frequency analysis on each pixel line, and a second frequency analysis process of collecting the one-dimensional frequency analysis results required for analysis of a small region, which have been obtained by the first frequency analysis process, and of obtaining a two-dimensional frequency analysis result so as to perform frequency analysis of the image.

The entire configuration is substantially the same as described above except that a process of dividing the partially acquired image into pixel lines is included in the image input process rather than the first frequency analysis process.

An image processing method according to a third aspect of the present invention includes an image input process of acquiring an original image partially in sequence, of dividing the partially acquired image into pixel lines, and of performing a first frequency analysis process for carrying out one-dimensional frequency analysis on each pixel line, and a second frequency analysis process of collecting the one-dimensional frequency analysis results required for analysis of a small region, which have been obtained by the first frequency analysis process, and of obtaining a two-dimensional frequency analysis result of the small region so as to perform frequency analysis of the image.

The entire configuration is substantially the same as described above except that a process of dividing the partially acquired image into pixel lines and the first frequency analysis process of performing one-dimensional frequency analysis on each pixel line are included in the image input process.

More specifically, the first frequency analysis process can be configured to perform one-dimensional Fourier transform on each pixel line. Further, the second frequency analysis process can be configured to collect one-dimensional Fourier transform results obtained by the first frequency analysis process and to perform further one-dimensional Fourier transform so as to obtain a two-dimensional Fourier transform result of the original image.

As with the aforementioned case, as soon as an original image is partially acquired and divided into pixel lines, one-dimensional Fourier transform can be started so as to shorten a standby time. A required number of the one-dimensional Fourier transform results for analysis of the small region are obtained in advance. A two-dimensional Fourier transform result of the original image is obtained based on these one-dimensional Fourier transform results. Accordingly, it is possible to reduce a load on a process and hence to achieve a reduction of an overall processing time required for a two-dimensional Fourier transform process.

Further, particularly in a case where small regions are successively extracted in a repeated manner so that a frequency component of each small region is calculated on the assumption that frequency analysis is performed on a wider area including the small region, frequency analysis results that have previously been obtained by the first frequency analysis process are repeatedly used in two-dimensional frequency analysis for a second or further time by the second frequency analysis process. It is possible to omit calculation for one-dimensional frequency analysis of overlapped pixel lines and to enhance a processing speed.

In the case where small regions are successively extracted in a repeated manner on the assumption that frequency analysis is performed on a wider area including the small region, an overlapped portion of frequency analysis results that have been obtained by the first frequency analysis process executed for the last or further preceding time can directly be utilized. Accordingly, the number of execution of the first frequency analysis process required to execute two-dimensional frequency analysis for a second or further time is reduced. Thus, it is possible to achieve a remarkable reduction of an overall processing time required for a frequency analysis process.

This image processing method can be used as an image processing method of acquiring an image of a fingerprint or a palmprint in an image input process, i.e., a fingerprint/palmprint image processing method. A processing time required for two-dimensional frequency analysis of the original image is shortened. As a result, an overall processing speed of fingerprint/palmprint image processing is shortened.

Further, this image processing method may be used as a fingerprint/palmprint image processing method of detecting the vicinity of a feature point in a fingerprint or a palmprint from a frequency analysis result and of restoring only ridge lines near the feature point. As with the aforementioned case, a processing time required for two-dimensional frequency analysis of the original image is shortened. As a result, ridge lines near the feature point can be restored in a short period of time.

An image processing software program according to a first aspect of the present invention is for implementing, with a microprocessor mounted on an image processing system for dividing an original image into small regions and for performing frequency analysis on each small region, an image input control function of acquiring an original image partially in sequence, a first frequency analysis function of dividing the partially acquired image into pixel lines and of performing one-dimensional frequency analysis on each pixel line, a second frequency analysis function of collecting the one-dimensional frequency analysis results required for analysis of a small region, which have been obtained by the first frequency analysis, and of obtaining a two-dimensional frequency analysis result of the small region.

As soon as an original image is partially acquired and divided into pixel lines, one-dimensional frequency analysis can be started so as to shorten a standby time. A required number of the one-dimensional frequency analysis results for analysis of the small region are obtained in advance approximately concurrently with acquisition of the image. A two-dimensional frequency analysis result of the small region is obtained based on these one-dimensional frequency analysis results. Accordingly, it is possible to reduce a load on a process and hence to achieve a reduction of an overall processing time required for a frequency analysis process.

An image processing software program according to a second aspect of the present invention is for implementing, with a microprocessor mounted on an image processing system for dividing an original image into small regions and for performing frequency analysis on each small region, an image input control function of acquiring an original image partially in sequence and of dividing the partially acquired image into pixel lines, a first frequency analysis function of performing one-dimensional frequency analysis on each pixel line, and a second frequency analysis function of collecting the one-dimensional frequency analysis results required for analysis of a small region, which have been obtained by the first frequency analysis, and of obtaining a two-dimensional frequency analysis result.

The entire configuration is substantially the same as described above except that a function of dividing the partially acquired image into pixel lines is included in the image input control function rather than the first frequency analysis function.

An image processing software program according to a third aspect of the present invention is for implementing, with a microprocessor mounted on an image processing system for dividing an original image into small regions and for performing frequency analysis on each small region, a first frequency analysis function of acquiring an original image partially in sequence, of dividing the partially acquired image into pixel lines, and of performing one-dimensional frequency analysis on each pixel line, and a second frequency analysis function of collecting the one-dimensional frequency analysis results required for analysis of a small region, which have been obtained by the first frequency analysis, and of obtaining a two-dimensional frequency analysis result.

The entire configuration is substantially the same as described above except that a function of dividing the partially acquired image into pixel lines is included in the first frequency analysis function of performing one-dimensional frequency analysis on each divided pixel line.

More specifically, the first frequency analysis function can be configured to perform one-dimensional Fourier transform on each pixel line. Further, the second frequency analysis function can be configured to collect one-dimensional Fourier transform results obtained by the first frequency analysis and to perform further one-dimensional Fourier transform so as to obtain a two-dimensional Fourier transform result of the original image.

As with the aforementioned case, as soon as an image is partially acquired and divided into pixel lines, one-dimensional Fourier transform can be started so as to shorten a standby time. A required number of the one-dimensional Fourier transform results for analysis of the small region are obtained in advance. A two-dimensional Fourier transform result of the original image is obtained based on these one-dimensional Fourier transform results. Accordingly, it is possible to reduce a load on a process and hence to achieve a reduction of an overall processing time required for a two-dimensional Fourier transform process.

Further, particularly in a case where small regions are successively extracted in a repeated manner so that a frequency component of each small region is calculated on the assumption that frequency analysis is performed on a wider area including the small region, frequency analysis results that have previously been obtained by the first frequency analysis function are repeatedly used in two-dimensional frequency analysis for a second or further time by the second frequency analysis function. It is possible to omit calculation for one-dimensional frequency analysis of overlapped pixel lines and to enhance a processing speed.

In the case where small regions are successively extracted in a repeated manner on the assumption that frequency analysis is performed on a wider area including the small region, an overlapped portion of frequency analysis results that have been obtained by the first frequency analysis function executed for the last or further preceding time can directly be utilized. Accordingly, the number of execution of the first frequency analysis function required to execute the two-dimensional frequency analysis function for a second or further time is reduced. Thus, it is possible to achieve a remarkable reduction of an overall processing time required for a frequency analysis process.

This image processing software program can be used as an image processing software program of acquiring an image of a fingerprint or a palmprint in an image input control function, i.e., a fingerprint/palmprint image processing software program. A processing time required for two-dimensional frequency analysis of the original image is shortened. As a result, an overall processing speed of fingerprint/palmprint image processing is shortened.

Further, this image processing software program may be used as an image processing software program of detecting the vicinity of a feature point in a fingerprint or a palmprint from a frequency analysis result and of restoring only ridge lines near the feature point. As with the aforementioned case, a processing time required for two-dimensional frequency analysis of the original image is shortened. As a result, ridge lines near the feature point can be restored in a short period of time.

In an image processing system, an image processing method, and an image processing software program according to the present invention, as soon as an original image is partially acquired and divided into pixel lines, one-dimensional frequency analysis can be started so as to shorten a standby time for image input until start of the one-dimensional frequency analysis. Moreover, in an image processing system, an image processing method, and an image processing software program according to the present invention, one-dimensional frequency analysis results are obtained in advance approximately concurrently with acquisition of the image. A two-dimensional frequency analysis result of the small region is obtained based on these one-dimensional frequency analysis results so as to reduce a load on a process. Accordingly, it is possible to shorten an overall processing time required for a frequency analysis process as compared to conventional technology in which two-dimensional Fourier transform is performed collectively on vertical and horizontal pixel values of a small region so as to perform frequency analysis.

BEST MODE FOR CARRYING OUT THE INVENTION

Next, the best mode for carrying out the present invention will be described in detail with reference to the drawings.

Figure 1:
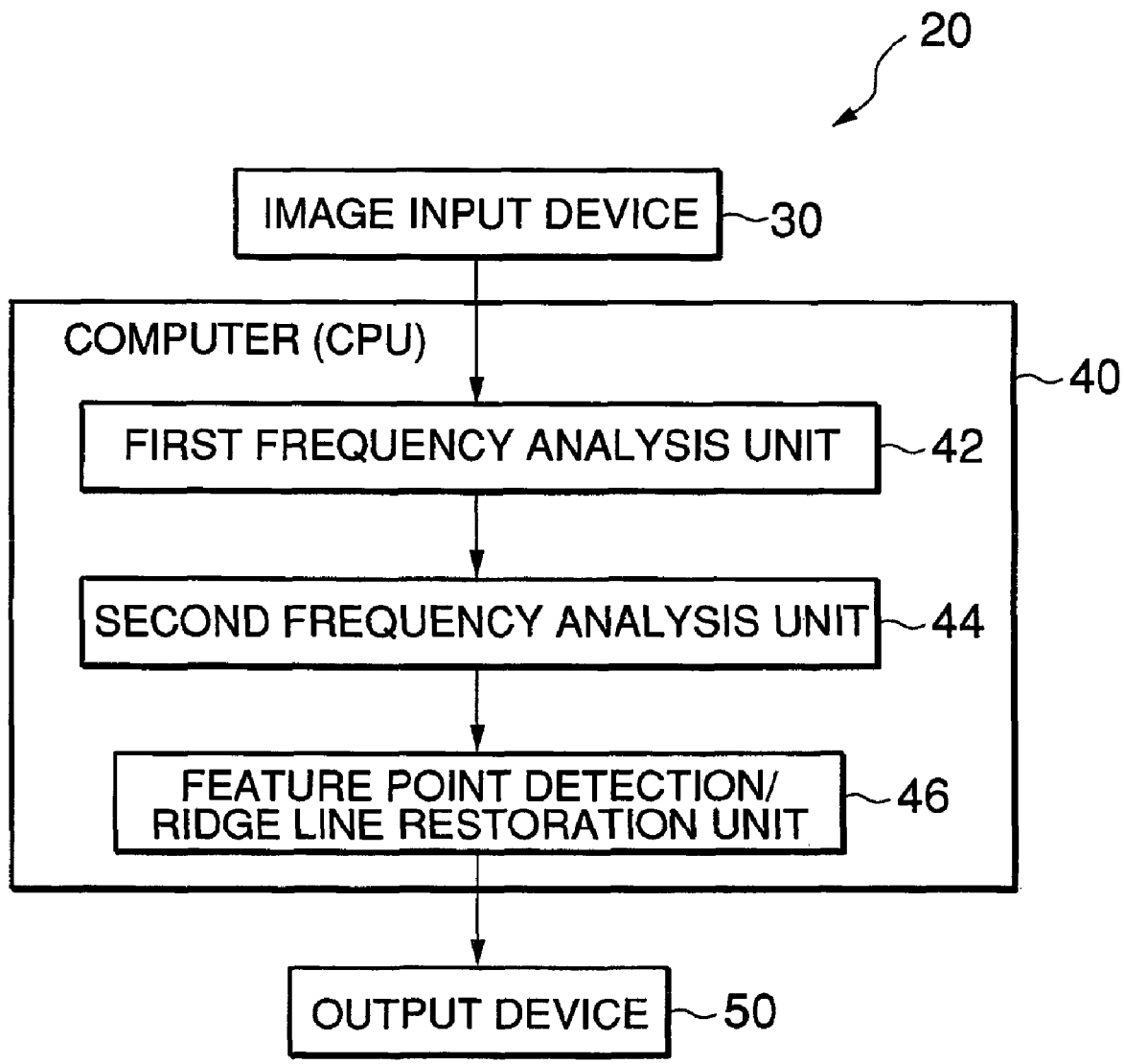
FIG. 1 is a functional block diagram showing an image processing system according to a first embodiment of the present invention in a simplified manner.

FIG. 1 is a functional block diagram showing an image processing system 20 according to a first embodiment of the present invention in a simplified manner. The image processing system 20 is a system for dividing an original image into small regions and for performing frequency analysis on each small region.

In brief, the illustrated image processing system 20 comprises an image input device 30 such as an image sensor, a computer (CPU) 40 operated by a program control, and an arithmetic result output device 50 such as a display. Further, the illustrated computer 40 includes a first frequency analysis unit 42, a second frequency analysis unit 44, and a feature point detection/ridge line restoration unit 46.

Figure 2:
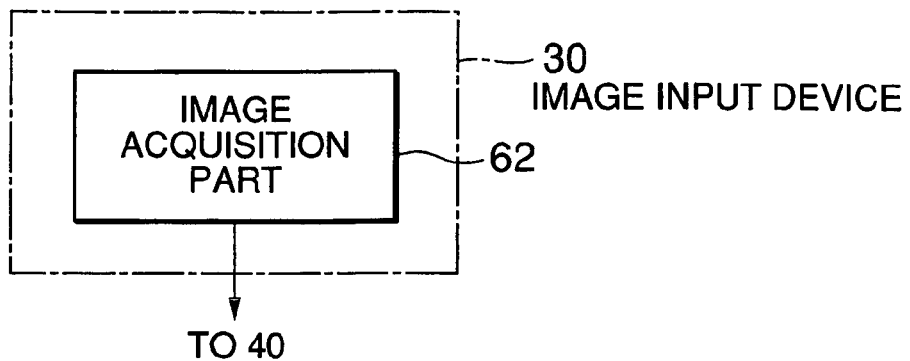
FIG. 2 is a block diagram showing an image input device used in the image processing system shown in FIG. 1.

Referring to FIG. 2, the image input device 30 comprises an image acquisition part 62. The image acquisition part 62 acquires an original image partially in sequence to produce the partially acquired images sequentially to the computer 40. The original image may be a fingerprint or a palmprint.

Figure 3:
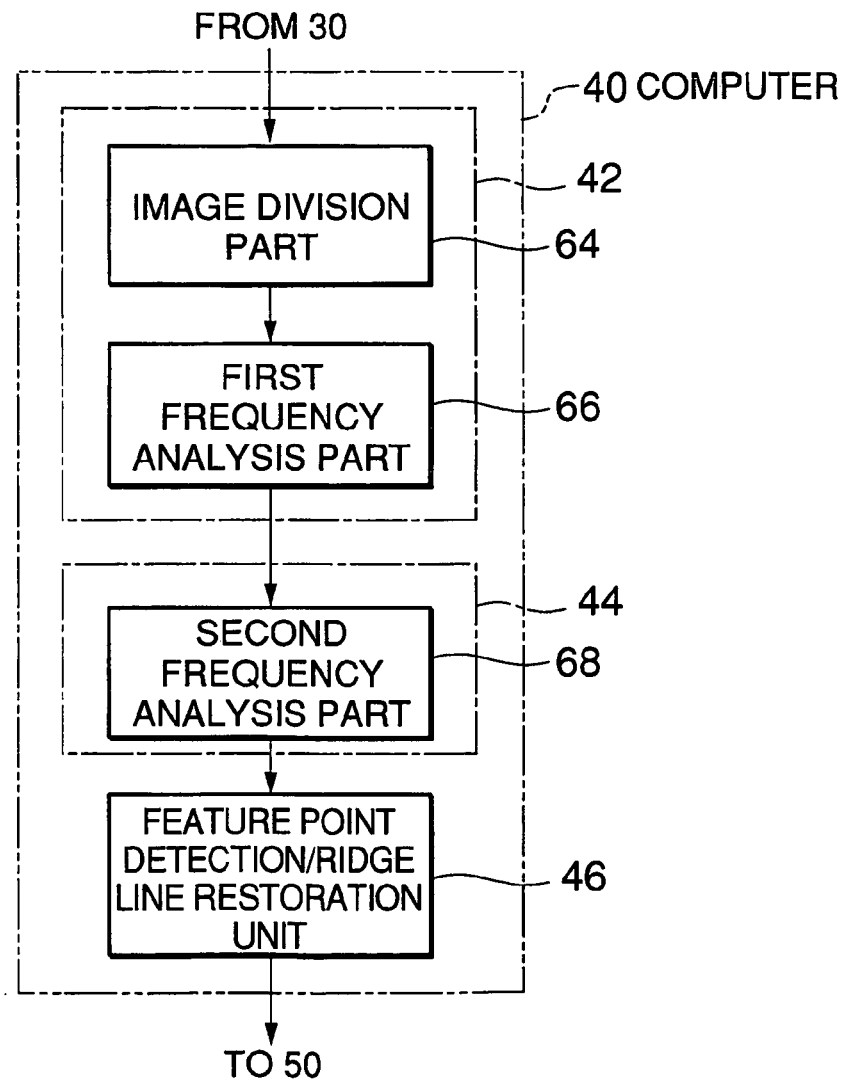
FIG. 3 is a functional block diagram showing a computer used in the image processing system shown in FIG. 1 in a simplified manner.

Referring to FIG. 3, the first frequency analysis unit 42 comprises an image division part 64 and a first frequency analysis part 66. The second frequency analysis unit 44 comprises a second frequency analysis part 68. The image division part 64 divides the partially acquired image into pixel lines and produces the pixel lines in sequence. The first frequency analysis part 66 performs one-dimensional frequency analysis on each pixel line so as to sequentially obtain one-dimensional frequency analysis results. In any case, the first frequency analysis unit 42 successively acquires pixel lines having a predetermined width from the image input device 100 and performs one-dimensional frequency analysis on each pixel line. The second frequency analysis part 68 collects a required number of the one-dimensional frequency analysis results for analysis of a small region to obtain a two-dimensional frequency analysis result of the small region. In any case, the second frequency analysis unit 44 collects a predetermined number of the one-dimensional frequency analysis results obtained by the first frequency analysis unit 42 and performs one-dimensional frequency analysis again on these one-dimensional frequency analysis results so as to obtain a two-dimensional frequency analysis result. In the case where the original image is a fingerprint or a palmprint, the feature point detection/ridge line restoration unit 46 detects the vicinity of a feature point in the fingerprint or the palmprint from the two-dimensional frequency analysis result, restores only ridge lines around the feature point, and produces the result to the arithmetic result output device 120.

Next, referring to a flow chart in FIG. 4, operation of the entire image processing apparatus 20 shown in FIG. 1 will be described. Hereinafter, a case where the original image is an image of a fingerprint or a palmprint will be described as an example.

First, an original image is inputted from the image input device 30 (Step A1). The image acquisition part 62 in the image input device 30 acquires the original image partially in sequence and sends the acquired portion (the partially acquired image) to the computer 40 whenever necessary (Step A2).

Subsequently, the image division part 64 in the first frequency analysis unit 42 divides the sent image (the partially acquired image) into pixel lines having a predetermined width (Step A3). Then the first frequency analysis part 66 in the first frequency analysis unit 42 performs one-dimensional frequency analysis on each divided pixel line to obtain one-dimensional frequency analysis results of the respective pixel lines (Step A4).

Further, the second frequency analysis part 68 in the second frequency analysis unit 44 collects a predetermined number of the one-dimensional frequency analysis results calculated for the respective pixel lines by the first frequency analysis part 66 in the first frequency analysis unit 42 and performs one-dimensional frequency analysis again on these one-dimensional frequency analysis results so as to obtain a two-dimensional frequency analysis result (Step A5).

The feature point detection/ridge line restoration unit 46 first detects the vicinity of a feature point in the fingerprint or the palmprint from the two-dimensional frequency analysis result (Step A6). Subsequently, the feature point detection/ridge line restoration unit 46 restores only ridge lines around the feature point (Step A7).

Then the arithmetic result output device 50 displays the ridge line restoration result (Step A8).

Figure 5:
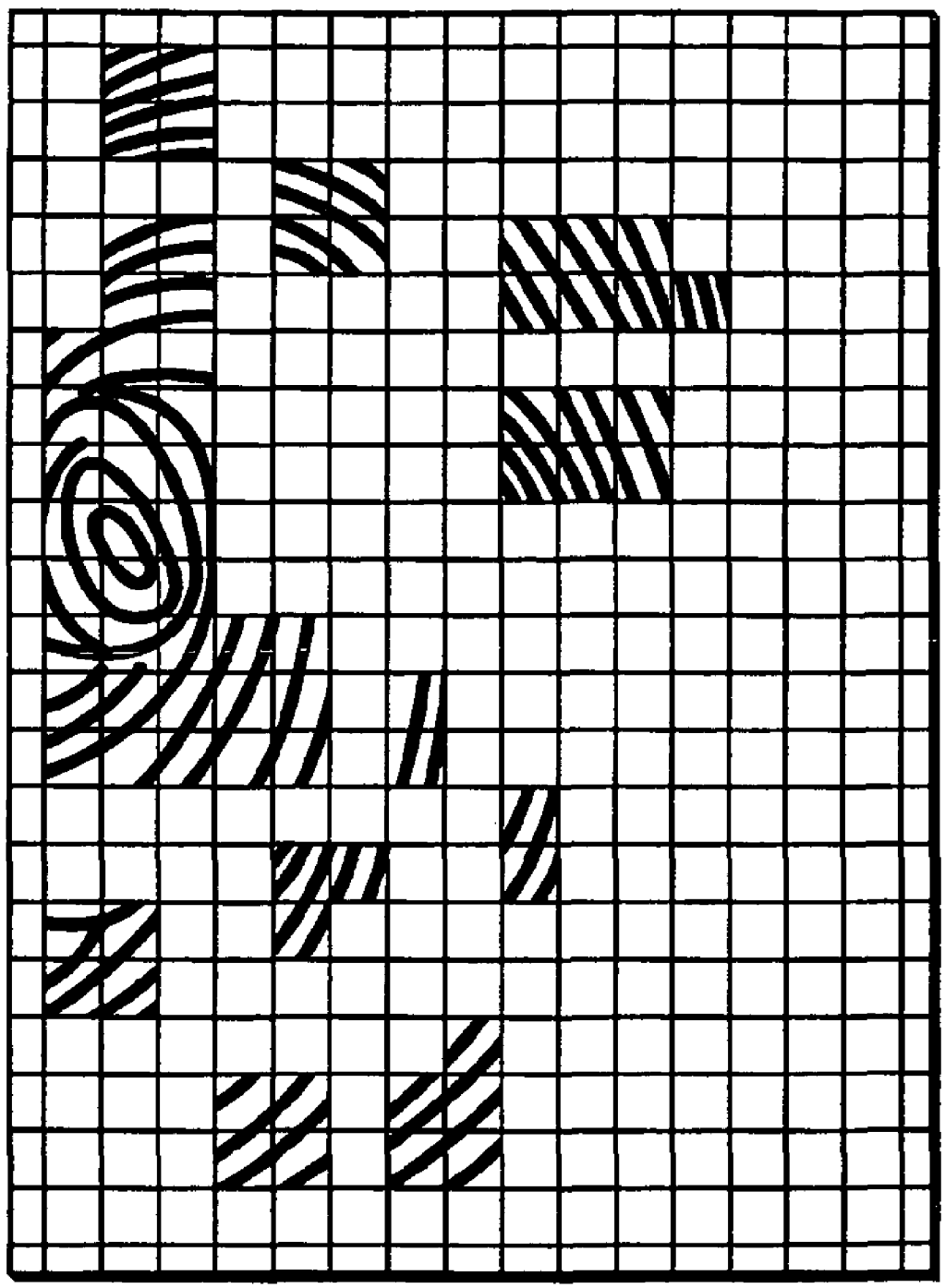
FIG. 5 is a diagram showing an example of a result in a case where ridge lines are restored only near feature points.

FIG. 5 shows an example of a result in a case where ridge lines are restored only near feature points.

Next, effects of the image processing system 20 according to the first embodiment of the present invention will be described below. Inasmuch as the image processing system 20 according to the first embodiment of the present invention is configured to perform frequency analysis on each pixel line having a predetermined width, a process of the frequency analysis can be started before the entire image is inputted. In addition, when images to be subjected to the two-dimensional frequency analysis overlap each other, the one-dimensional frequency analysis results obtained by the first frequency analysis unit 42 can be reused for the process of the two-dimensional frequency analysis in the second frequency analysis unit 44, thereby reducing a processing time.

Subsequently, operation of the respective devices (units) will specifically be described below with an example in which the image processing system 20 is employed as a fingerprint/palmprint image processing system.

Here, a fingerprint/palmprint sensor is used as the image input device 30, and a personal computer is used as the computer 40. The personal computer 40 is provided with a display, which serves as the arithmetic result output device 50. Further, the personal computer 40 comprises the first frequency analysis unit 42, the second frequency analysis unit 44, and the feature point detection/ridge line restoration unit 46.

Images may be inputted from the fingerprint/palmprint sensor 30 into the personal computer 40 via a network. The frequency analysis process may be performed on fingerprint/palmprint images that have already been recorded in a storage device such as an internal/external memory or hard disk drive of the personal computer 40.

In the case where the frequency analysis process is performed on fingerprint/palmprint images that have already been recorded in a storage device such as a memory or a hard disk drive, the fingerprint/palmprint sensor and the like are unnecessary for the image processing system 20. In this case, the image input device 30 is formed by a data reading device for reading a partial image from the fingerprint/palmprint image stored in the memory or the hard disk drive.

The frequency analysis results may not only be outputted to the display as the arithmetic result output device 50, but also be delivered to another processing apparatus via a network, or be recorded in a storage device such as an internal/external memory or hard disk drive of the personal computer and then delivered to another processing apparatus.

Figure 6:
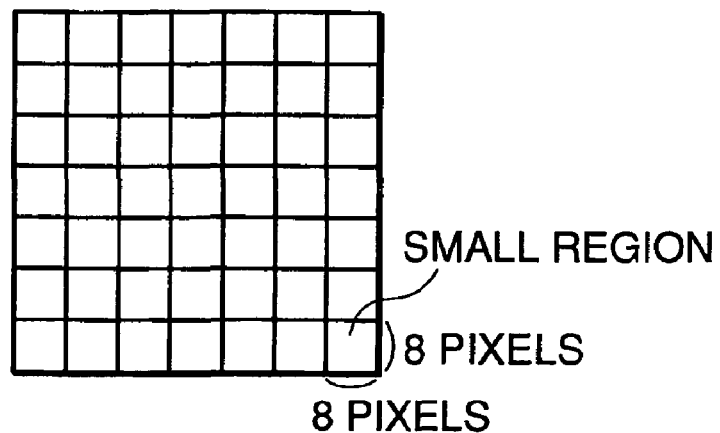
FIG. 6 is a conceptual diagram showing an example of division of small regions.

Each small region in an image inputted from the fingerprint/palmprint sensor 30 is subjected to frequency analysis. The image may be divided into small regions in a desired manner. In this example, as shown in FIG. 6, the image is divided in the form of a grid square. The sensor 30 has 20 pixels per millimeter. The image is divided into grid squares each having 8 pixels on each side. However, other sizes and shapes may be applied to the present invention.

Figure 7:
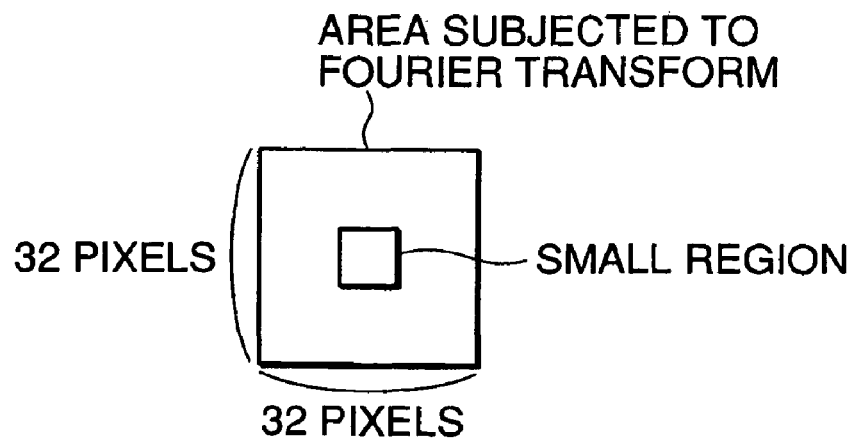
FIG. 7 is a conceptual diagram showing an example of a relationship between a small region and an area subjected to frequency analysis (Fourier transform area)

The frequency analysis may be performed on a small region or may be performed on an image surrounding a small region so as to stably evaluate the periodicity. In this example, as shown in FIG. 7, frequency analysis is performed on a square portion having 32 pixels on each side around a small region. As a matter of course, other sizes may be applied to the present invention.

In order to accurately determine the periodicity of the fingerprint/palmprint ridge lines, it is desirable that an area to be subjected to frequency analysis includes at least about two ridge lines. In addition, if an area to be subjected to frequency analysis is excessively large, then the frequency analysis is greatly influenced by the curvature of ridge lines. Accordingly, it is desirable that an area to be subjected to frequency analysis is smaller than an area including about four ridge lines.

When one line of the image is inputted from the fingerprint/palmprint sensor 30, images having a width of 32 pixels (corresponding to the size to be subjected to the frequency analysis) are extracted at intervals of 8 pixels (corresponding to the size of the small region) and then subjected to one-dimensional Fourier transform in the first frequency analysis unit 42. Specifically, the first frequency analysis unit 42 is operable as a first Fourier transformer for performing one-dimensional Fourier transform on each divided pixel line so as to sequentially obtain one-dimensional Fourier transform results as the one-dimensional frequency analysis results.

Because the first frequency analysis unit 42 can operate with only one line of the input image, it is not necessary to wait for the entire image to be inputted. Thus, the first frequency analysis unit 42 can operate as soon as one pixel line is inputted.

Figure 8:
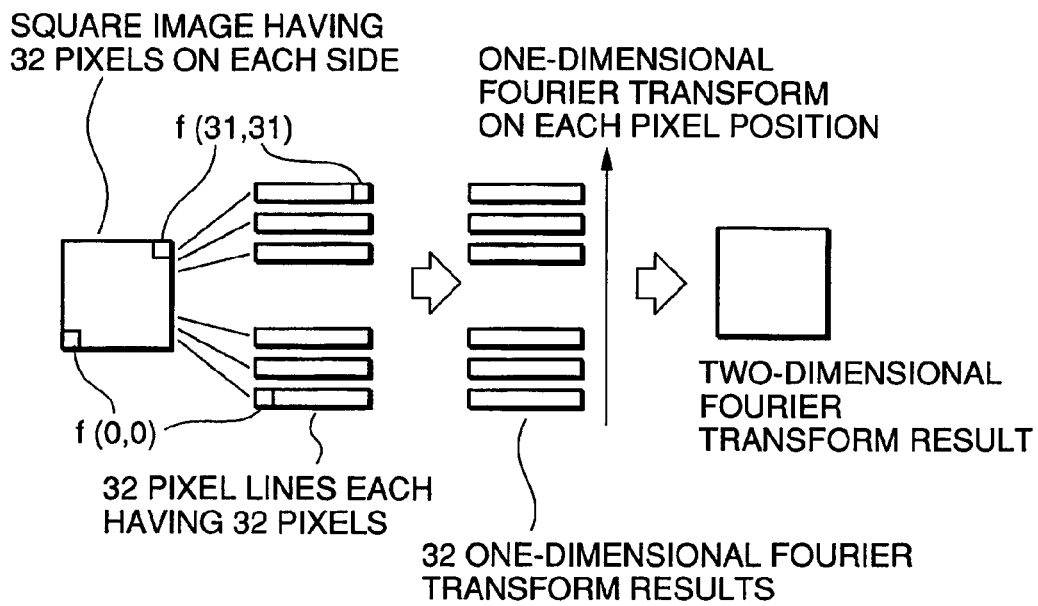
FIG. 8 is a conceptual diagram showing a relationship between one-dimensional Fourier transform and two-dimensional Fourier transform.

When the one-dimensional Fourier transform is performed on 32 lines (corresponding to the size to be subjected to the frequency analysis) by the first frequency analysis unit 42, the second frequency analysis unit 44 collects one-dimensional Fourier transform results of the 32 lines and performs Fourier transform on them so as to obtain a two-dimensional Fourier transform result of a square image having 32 pixels on each side as shown in FIG. 8. Specifically, the second frequency analysis unit 44 is operable as a second Fourier transformer for collecting the one-dimensional Fourier transform results and for performing further one-dimensional Fourier transform so as to obtain a two-dimensional Fourier transform result as the two-dimensional frequency analysis result of the small region.

This is represented by the following formulas. It is assumed that that pixel positions are defined in accordance with a coordinate system in which the origin is positioned at a lower left point of the square having 32 pixels on each side as shown in FIG. 8, a rightward direction is defined as +X, and an upward direction is defined as +Y, and that a pixel value (density) at a pixel position (x, y) is represented by f(x, y) (x=0, 1, 2, . . . , 31, y=0, 1, 2, . . . , 31).

First, when a pixel line (one pixel line in a horizontal direction) located at a Y-coordinate of y is subjected to one-dimensional Fourier transform, the result $F_1(p, y)$ is represented by $$F_1(p, y) = \sum_{X=0}^{31} f(x, y)e^{-i\frac{2\pi}{32}px} \quad (1)$$

When the respective results of the one-dimensional Fourier transform are collectively subjected to a further Fourier transform, the result is represented by $$F_2(p, q) = \sum_{y=0}^{31} F_1(p, y)e^{-i\frac{2\pi}{32}qy} \quad (2)$$

$$= \sum_{y=0}^{31}\sum_{x=0}^{31} f(x, y)e^{-i\frac{2\pi}{32}(px+qy)}$$

$F_2(p, q)$ is equivalent to a result obtained in a case where the original image is subjected to two-dimensional Fourier transform.

Because the second frequency analysis unit 44 can operate if the results of the one-dimensional Fourier transform of 32 lines are collected, it is not necessary to wait for the entire image to be inputted.

In a case where discrete Fourier transform is performed, a window function is often used to reduce an influence of discontinuity near boundaries of data. In such a case, the same process can also be performed. For example, it is assumed that two-dimensional Fourier transform is performed in the following manner with use of a Gaussian window of a variance σ.

$$F_2(p, q) = \sum_{y=0}^{31} \sum_{x=0}^{31} \frac{1}{\sqrt{2\pi\sigma^2}} e^{-2\pi^2\sigma^2\{(x-x_0)^2+(y-y_0)^2\}} f(x, y) e^{-i\frac{2\pi}{32}(px+qy)} \quad (3)$$

Here, $(x_0, y_0)$ is a coordinate value of the center of the image and is 15.5 (=31/2) in this case. Calculation of the Gaussian window is performed with the center of $(x_0, y_0)$ so as to align the center of the Gaussian window with the center of the image. In such a case, the first frequency analysis unit 42 performs one-dimensional Fourier transform based on the following arithmetic expression.

$$F_1(p, y) = \sum_{x=0}^{31} \frac{1}{\sqrt{2\pi\sigma^2}} e^{-2\pi^2\sigma^2(x-x_0)^2} f(x, y) e^{-i\frac{2\pi}{32}px} \quad (4)$$

Further, the second frequency analysis unit 44 performs the following calculation.

$$F_2(p, q) = \sum_{y=0}^{31} \frac{1}{\sqrt{2\pi\sigma^2}} e^{-2\pi^2\sigma^2(y-y_0)^2} F_1(p, y) e^{-i\frac{2\pi}{32}qy} \quad (5)$$

Thus, calculation can successively be performed. Any window function other than the Gaussian window, such as a rectangular window, can be applied as long as calculation can be separated in a vertical direction and a horizontal direction.

Figure 9:
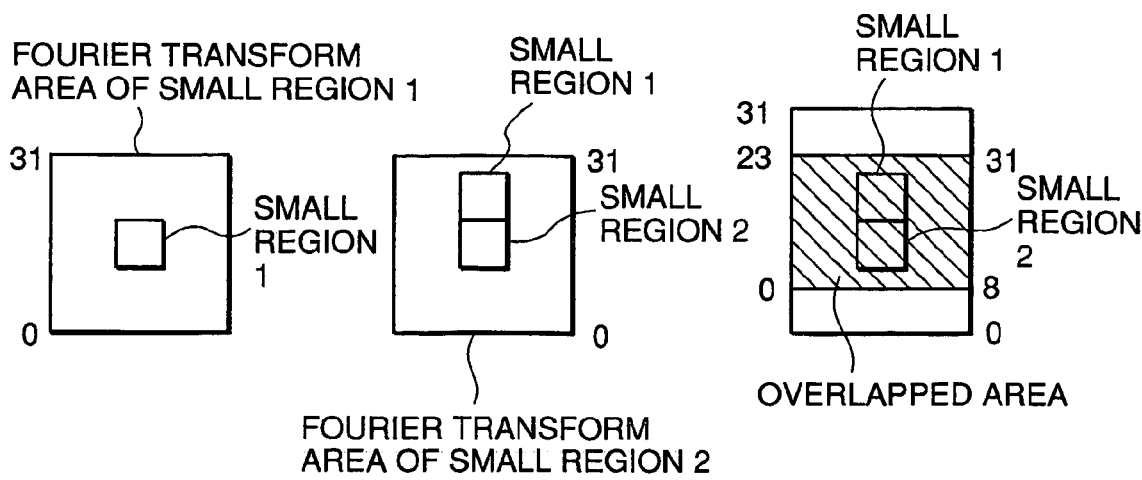
FIG. 9 is a conceptual diagram showing an example in which areas subjected to frequency analysis (Fourier transform areas) for a plurality of small regions overlap each other.

With regard to small regions abutting perpendicular to a direction in which the first frequency analysis unit 42 performs one-dimensional Fourier transform, areas to be subjected to Fourier transform in the second frequency analysis unit 44 overlap each other as shown by a diagonally shaded portion in FIG. 9. When the second frequency analysis unit 44 performs frequency analysis on a small region 2 shown in FIG. 9, one-dimensional Fourier transform results of the diagonally shaded area, which have been used to perform frequency analysis on a small region 1 shown in FIG. 9, can be reused. Accordingly, the amount of calculation can be reduced as compared to a case where two-dimensional Fourier transform is performed on each of the small region 1 and the small region 2.

Further, inasmuch as a period of ridge lines in a fingerprint or a palmprint is limited to a specific range, high-frequency components that cannot exist for ridge lines in a fingerprint or a palmprint may be removed in the first and second frequency analysis units 42 and 44. In this manner, components to be processed are reduced in number, and the amount of calculation can thus be reduced.

Finally, two-dimensional Fourier transform results of the respective small regions are obtained in the second frequency analysis unit 44, and ridge lines are restored in the feature point detection/ridge line restoration unit 46. Then the ridge line restoration results are outputted on the display 50.

The second frequency analysis unit 44 produces frequency information as the two-dimensional frequency analysis result for each small region. The feature point detection/ridge line restoration unit 46 restores ridge lines in the fingerprint or the palmprint from the frequency information to produce ridge line information.

Here, the feature point detection/ridge line restoration unit 46 may restore ridge lines by removing wrinkles or noise from the frequency information of the respective small regions with use of the methods of Patent Document 2 to Patent Document 5 described in Background Art. In this case, it is possible to accurately produce ridge line information even with wrinkle or noise. More specifically, as disclosed by Patent Document 2 to Patent Document 5, the feature point detection/ridge line restoration unit 46 can restore ridge lines by removing noise components from the two-dimensional frequency analysis result and then performing inverse transform or by determining one specific point in a two-dimensional frequency space from the two-dimensional frequency analysis result and then performing inverse transform on the specific point. In the case of Fourier transform, the inverse transform corresponds to a two-dimensional sine wave.

Further, the feature point detection/ridge line restoration unit 46 can detect a possible feature point in the fingerprint or the palmprint (a point at which a ridge line ends or branches) from the frequency information of small regions or the relationship of the frequency information between the small regions and can produce only frequency information of that point or restore ridge lines at that point. Here, a method disclosed in claim 6 of Japanese Patent Application No. 2004-61292 (hereinafter referred to as a feature point detection method) can be used to determine the vicinity of a feature point. Specifically, with this feature point detection method, the feature point detection/ridge line restoration unit 46 detects the vicinity of a feature point in the fingerprint or the palmprint from the two-dimensional frequency analysis result or determines the vicinity of a feature point by comparison with the two-dimensional frequency analysis result of an adjacent small region. Why to perform the comparison is that the two-dimensional frequency analysis result becomes different from a two-dimensional frequency analysis result of an adjacent small region as ridge lines discontinuously flow between adjacent regions near a feature point.

Referring to a flow chart of FIG. 10 and an operational principle diagram of FIG. 11, an example of process operation of a microprocessor (hereinafter referred to as CPU) in the personal computer 40 at portions serving as the first and second frequency analysis units 42 and 44 will specifically be described.

It is assumed that the fingerprint/palmprint sensor 30 autonomously starts to operate when it receives an image acquisition command from the CPU of the personal computer 40 and that the fingerprint/palmprint sensor 30 produces a pixel value at each pixel (x, y) in an image region of a square having 32 pixels on each side as shown in FIG. 8 in serial order from the lower left point to the upper right point such as (0, 0), (1, 0), (2, 0), . . . , (31, 0), . . . , (0, i), (1, i), (2, i), . . . , (31, i), . . . , (0, 31), (1, 31), (2, 31), . . . , (31, 31).

When the fingerprint/palmprint image processing system 20 is started, the CPU 40 first sets a flag F, stores a start of extraction of the first small region from the image (Step a1), initializes, into zero, register specifying indexes x and y for specifying a pixel value memory register for storing pixel values used in a first frequency analysis process and a one-dimensional Fourier transform result memory register for storing results of one-dimensional Fourier transform (first frequency analysis process) using one line of pixel values (Step a2), and produces an image acquisition command to the fingerprint/palmprint sensor 30 so that the fingerprint/palmprint sensor 30 starts acquisition of an image (Step a3).

When a pixel value is inputted from the fingerprint/palmprint sensor 30 (Step a4), the CPU 40 stores the pixel value into the pixel value memory register f(x, y) based on the current values of the register specifying indexes x and y (Step a5) and determines whether the current value of the register specifying index x reaches a preset value of 31, i.e., whether to complete input of all pixel values of 32 pixels arranged in one horizontal line (Step a6). If input of one line of pixel values has not been completed, then the CPU 40 increments the value of the register specifying index x by 1 (Step a7) and then prepares for input of the next pixel value (Step a4).

By repeating the above process, as shown in FIG. 8, pixel values of pixels at a spot (0, 0) to a spot (31, 0) in the image of a 32-pixel square are first stored into the respective pixel value memory registers f(0, 0) to f(31, 0) in a one-to-one correspondence.

When it is determined in the judgment process of Step a6 that the current value of the register specifying index x has reached the preset value of 31 and that the image input process of one divided line of pixels has been completed, the CPU 40, which serves as the first frequency analysis unit 42, executes the arithmetic expression (1) (or expression (4)), i.e., a first frequency analysis process, based on the 32-pixel values stored in the pixel value memory registers f(0, 0) to f(31, 0), thereby obtaining a result of one-dimensional Fourier transform performed on the pixel line located at a Y-coordinate of 0. The CPU 40 stores the result into the one-dimensional Fourier transform result memory register $F_1(p, y)$ based on the current value of the register specifying index y (Step a8).

Subsequently, the CPU 40 determines whether the flag F has been set, i.e., whether the current one-dimensional Fourier transform process is being performed during extraction of the first small region from the image (Step a9).

At the present time, the flag F is set, which means that the current one-dimensional Fourier transform process is being performed during extraction of the first small region from the image. Accordingly, the CPU 40 further determines whether the current value of the register specifying index y has reached the preset value of 31, i.e., whether results of the one-dimensional Fourier transform have been obtained for all 32 pixel lines arranged in the vertical direction (Step a10). If results of the one-dimensional Fourier transform have not been obtained for all 32 pixel lines arranged in the vertical direction, then the CPU 40 increments the value of the register specifying index y by one (Step a11), initializes the value of the register specifying index x into 0 again (Step a12), and then starts an image input process of pixel values on the next line in the same manner as described above (Step a4 to Step a7).

By repeating two types of loop processes as described above, one-dimensional frequency analysis results of 32 lines, which are required to analyze a small region, are obtained and stored into the one-dimensional Fourier transform result memory registers $F_1(p, 0)$ to $F_1(p, 31)$ in a one-to-one correspondence.

If it is determined in the judgment process of Step a10 that the current value of the register specifying index y has reached the preset value of 31, then the CPU 40 resets the flag F so as to store the completion of the extraction of the initial small region from the image (Step a13).

Next, the CPU 40, which serves as the second frequency analysis unit 44, executes the arithmetic expression (2) (or expression (5)), i.e., a second frequency analysis process, based on the one-dimensional Fourier transform results of the 32 lines, which have been stored in the one-dimensional Fourier transform result memory registers $F_1(p, 0)$ to $F_1(p, 31)$, thereby obtaining $F_2(p, q)$ as a result of the two-dimensional Fourier transform performed on the small region (Step a14). The CPU 40 produces this arithmetic result, for example, on a display (Step a15).

Here, the CPU 40 executes a process of storing the values of the one-dimensional Fourier transform result memory registers $F_1(p, 0)$ to $F_1(p, 23)$ into backup registers $G_1(p, 0)$ to $G_1(p, 23)$ in a one-to-one correspondence in order to reuse some of the one-dimensional frequency analysis results, which have been calculated by the first frequency analysis unit 42 to perform the current two-dimensional Fourier transform process, in the next two-dimensional Fourier transform process (Step a16).

As described above, in the present embodiment, images having a width of 32 pixels are extracted at intervals of 8 pixels. Accordingly, as apparent from FIG. 9, if an image is extracted around the small region 1 in the current process, an area to be extracted is moved downward in the next process by 8 pixels so that an image is extracted around the small region 2. Thus, the eighth to thirty-first pixel lines of the zeroth to thirty-first pixel lines in the next Fourier transform area overlap the zeroth to twenty-third pixel lines in the current Fourier transform area. Therefore, if the values of the registers $F_1(p, 0)$ to $F_1(p, 23)$, which are the one-dimensional Fourier transform results of the zeroth to twenty-third pixel lines in the current Fourier transform area, are held without overwrite until the next process cycle, then the one-dimensional Fourier transform process is required only for the zeroth to seventh pixel lines in the Fourier transform area around the small region 2 during the next two-dimensional Fourier transform process, thereby reducing a load on arithmetic processing.

Subsequently, the CPU 40 determines whether continuation of the two-dimensional frequency analysis to the next small region has been set (Step a17). If the continuation has been set, then the CPU 40 moves the small region to be analyzed downward by 8 pixels. For example, the CPU 40 moves the small region to be analyzed from the small region 1 to the small region 2 shown in FIG. 9 (Step a18) and then repeatedly executes the aforementioned processes subsequent to Step a2 on a new small region, e.g., the small region 2, in the same manner as described above. The setting and canceling of the continuation of the two-dimensional frequency analysis can readily be conducted by operation such as on/off switching of an execution flag in accordance with a command from a keyboard of the personal computer 40 or the like. Alternatively, the number of repetition of the overall process may previously be set according to the size of an entire image requiring a frequency analysis.

The process flow in the case where small regions subsequent to the second small region are selected as being analyzed is the same as described above in its entirety. However, in the process performed for the small regions subsequent to the second small region, inasmuch as the flag F has already been reset (see Step a13), the judgment result in Step a9 always becomes false.

Accordingly, the CPU 40 determines whether the current value of the register specifying index y has reached a preset value of 7 (Step a19), obtains one-dimensional Fourier transform results of the zeroth to seventh lines by the same loop process as described above, and overwrites the one-dimensional Fourier transform result memory registers $F_1(p, 0)$ to $F_1(p, 7)$ with these results so that these results are stored in the one-dimensional Fourier transform result memory registers $F_1(p, 0)$ to $F_1(p, 7)$ in a one-to-one correspondence.

If it is determined in the judgment process of Step a19 that the current value of the register specifying index y has reached the preset value of 7, then the CPU 40, which serves as the second frequency analysis unit 44, overwrites the one-dimensional Fourier transform result memory registers $F_1(p, 8)$ to $F_1(p, 31)$ with the values of the backup registers $G_1(p, 0)$ to $G_1(p, 23)$ so that the values of the backup registers $G_1(p, 0)$ to $G_1(p, 23)$ are stored in the one-dimensional Fourier transform result memory registers $F_1(p, 8)$ to $F_1(p, 31)$ in one-to-one correspondence (Step a20). As with the aforementioned process, the CPU 40 executes the arithmetic expression (2) (or expression (5)), i.e., a second frequency analysis process, based on the one-dimensional Fourier transform results of the 32 lines, which have been stored in the one-dimensional Fourier transform result memory registers $F_1(p, 0)$ to $F_1(p, 31)$ at the present time, i.e., based on values of $F_1(p, 0)$ to $F_1(p, 7)$ that are newly calculated and the values of $F_1(p, 8)$ to $F_1(p, 31)$ that have already been calculated. Then the CPU 40 obtains $F_2(p, q)$ as a result of a two-dimensional Fourier transform performed on a small region to be analyzed at that time, e.g., the small region 2 shown in FIG. 8 (Step a14). Subsequently, the CPU 40 produces this arithmetic result, for example, on the display or the like (Step a15) and then executes a backup process in the same manner as described above (Step a16) in order to reuse the one-dimensional frequency analysis results obtained by the first frequency analysis unit 42 in the next two-dimensional Fourier transform process.

Figure 11:
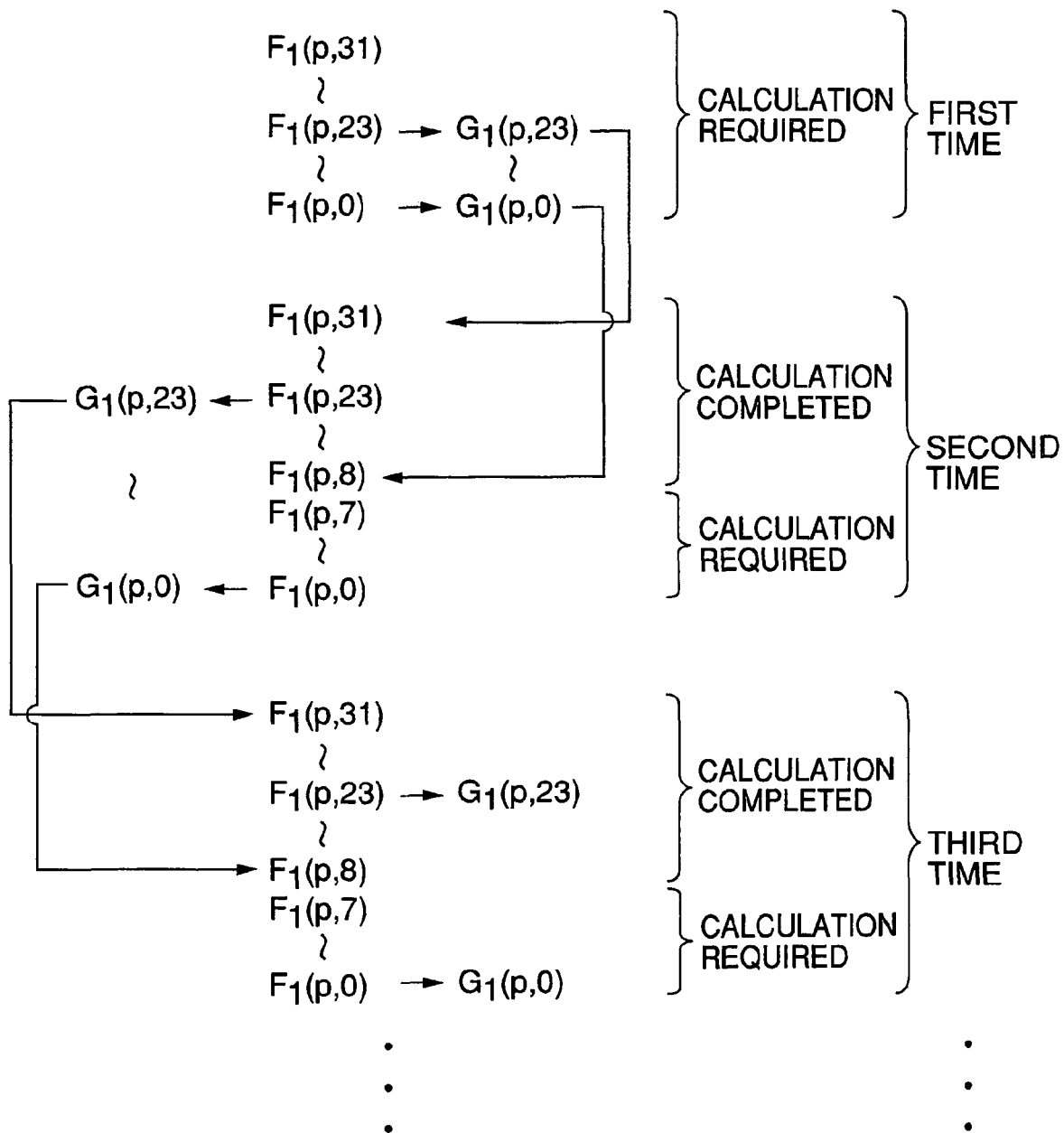
FIG. 11 is an operational principle diagram showing an example in which one-dimensional frequency analysis results obtained by the first frequency analysis part are reused to reduce a load on arithmetic processing.

Here, FIG. 11 shows a specific example of reuse of the one-dimensional frequency analysis results obtained by the first frequency analysis unit 42.

In the present embodiment, as shown in FIG. 11, only when two-dimensional frequency analysis is to be performed on the first small region, the first frequency analysis unit 42 executes the arithmetic process (expression (1) or (4)) on 32 lines and stores the values into the one-dimensional Fourier transform result memory registers $F_1(p, 0)$ to $F_1(p, 31)$. In a two-dimensional frequency analysis process for a second or further time, values of one-dimensional Fourier transform results that have previously been obtained by the first frequency analysis unit 42 are repeatedly reused with intermediaries of the backup registers $G_1(p, 0)$ to $G_1(p, 23)$. As a result, calculation of the one-dimensional frequency analysis (expression (1) or (4)) of 24 overlapped pixel lines can be skipped, and, in fact, the first frequency analysis unit 42 is required to execute a calculation process for only 8 pixel lines of the zeroth to seventh pixel lines.

The case where the small region to be analyzed is moved downward has been described for brevity. Practically, inasmuch as the entire image as shown in FIG. 6 should be processed, it is necessary to move the small region to be analyzed laterally as well. In such a case, when the small region to be analyzed reaches the lower end of the entire image, it is laterally shifted. The subsequent process is the same as described above, and the details thereof are omitted.

Figure 12:
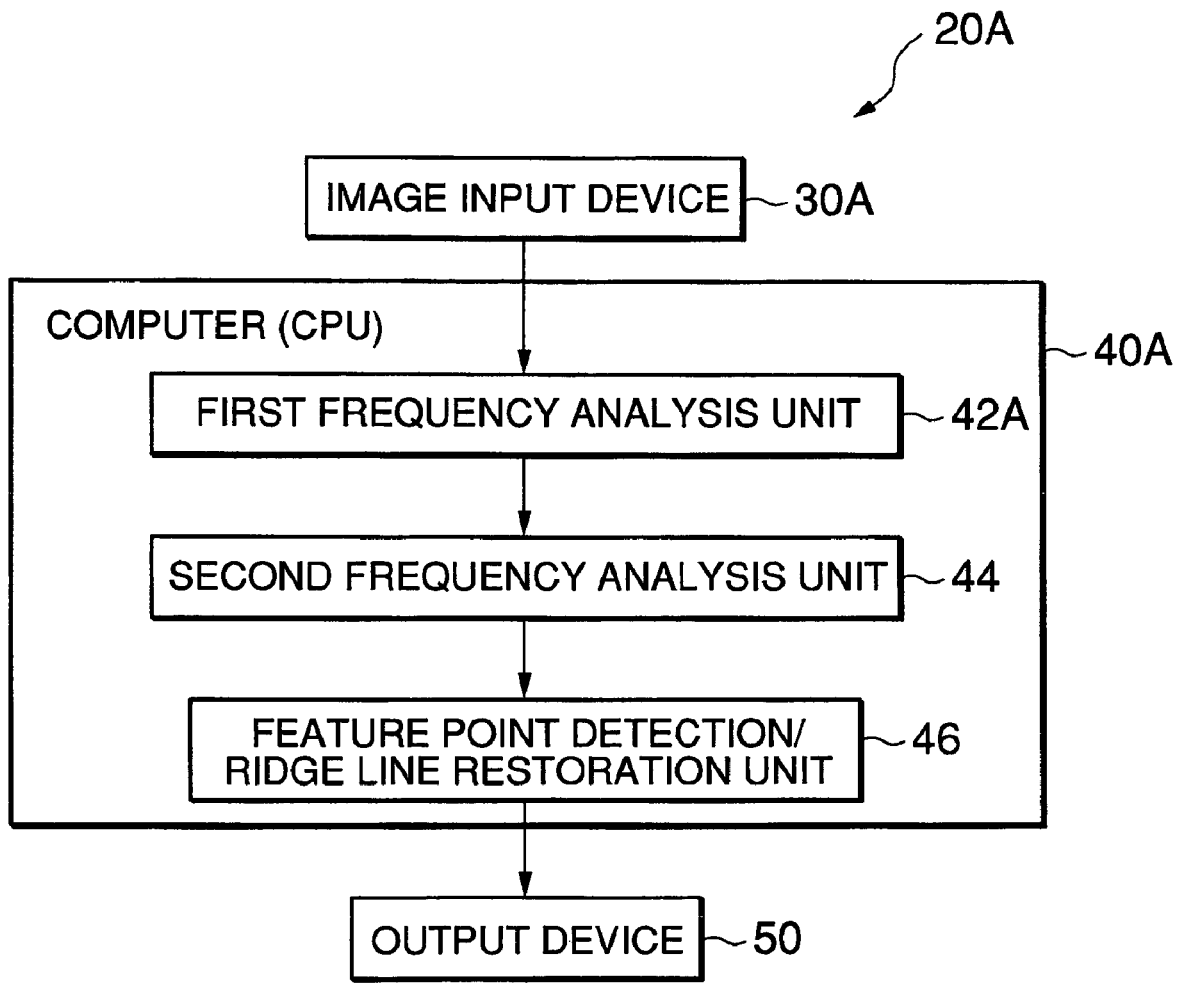
FIG. 12 is a functional block diagram showing an image processing system according to a second embodiment of the present invention in a simplified manner.

Referring to FIG. 12, an image processing system 20A according to a second embodiment of the present invention differs from the image processing system 20 according to the first embodiment of the present invention shown in FIG. 1 in operation of an image input device 30A and operation of a first frequency analysis unit 42A in a computer 40A.

Figure 13:
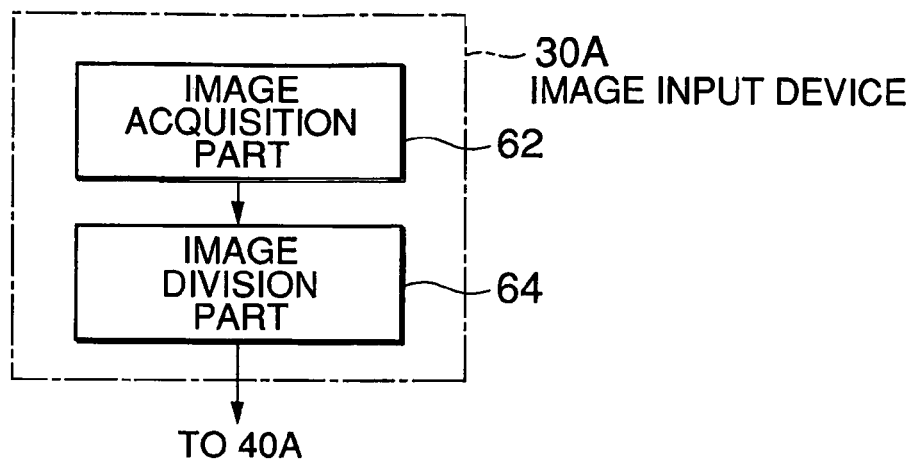
FIG. 13 is a block diagram showing an image input device used in the image processing system shown in FIG. 12.

Referring to FIG. 13, the image input device 30A comprises an image acquisition part 62 and an image division part 64.

Figure 14:
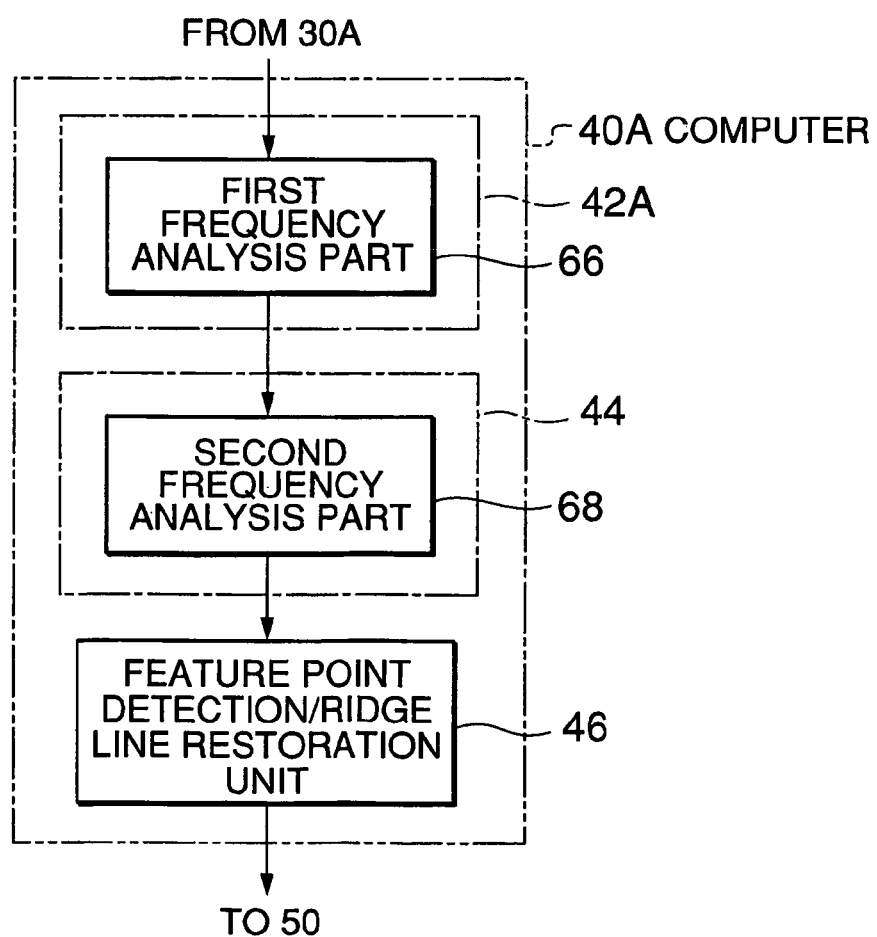
FIG. 14 is a functional block diagram showing a computer used in the image processing system shown in FIG. 12 in a simplified manner.

Referring to FIG. 14, the first frequency analysis unit 42A comprises only a first frequency analysis part 66.

Specifically, the image input device 30A sends a pixel line having a predetermined width from an input image (original image) successively to the computer 40A. The first frequency analysis unit 42A performs one-dimensional frequency analysis on the pixel line sent from the image input device 30A.

Figure 15:
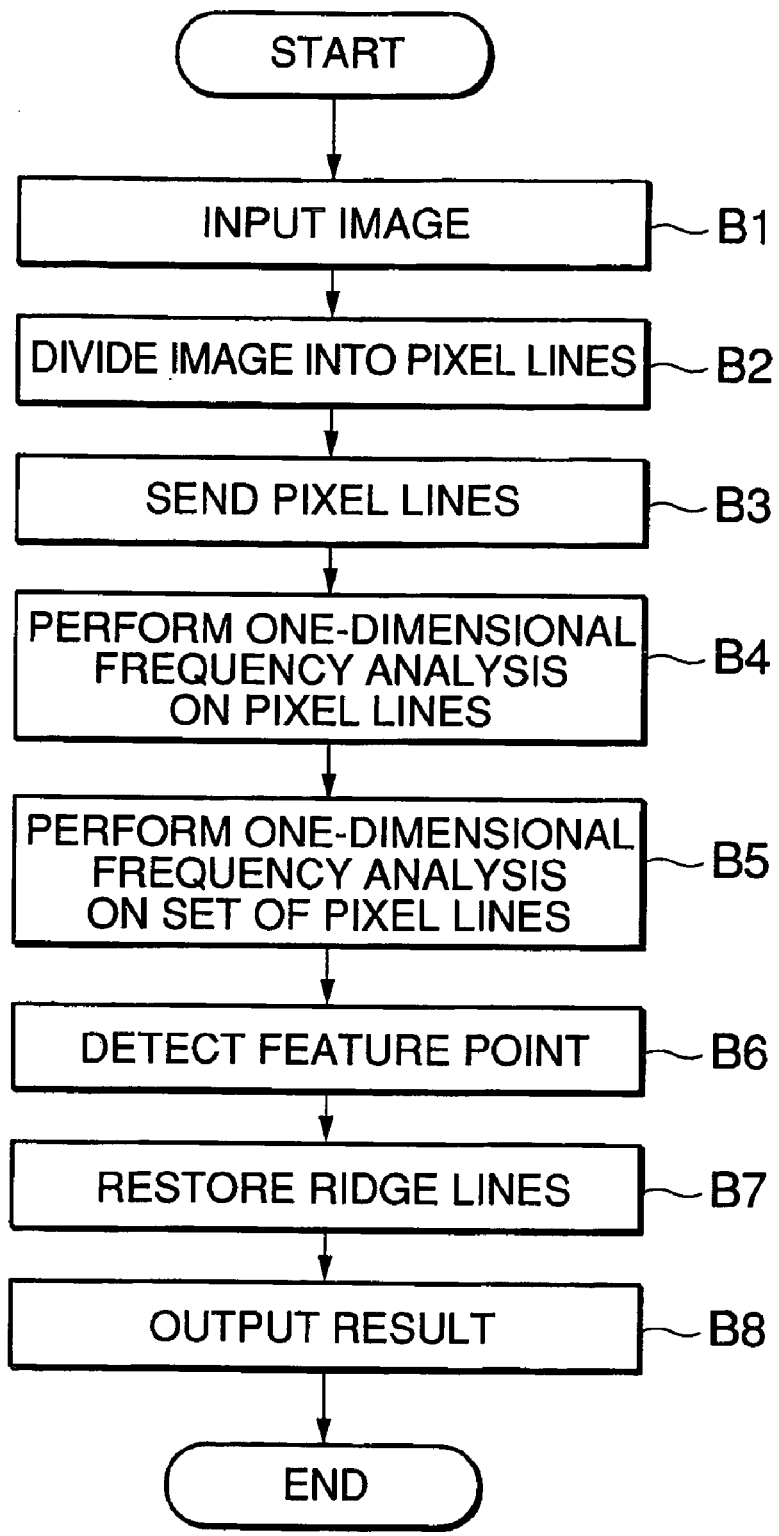
FIG. 15 is a flow chart showing operation of the entire image processing system in the second embodiment.

Next, referring to a flow chart in FIG. 15, operation of the entire image processing system 20A according to the second embodiment of the present invention shown in FIG. 12 will be described below.

The image acquisition part 62 in the image input device 30A inputs an original image (Step B1). Specifically, the image acquisition part 62 acquires the original image partially in sequence to produce the partially acquired image sequentially. Then the image division part 64 in the image input device 30A divides the partially acquired image into pixel lines having a predetermined width (Step B2) and sends the divided pixel lines successively to the computer 40A (Step B3). For example, in a case where the image input device 30A is formed by a fingerprint/palmprint image input device, the fingerprint/palmprint image input device divides an image (original image) inputted from a sensor successively into pixel lines having a width of 32 pixels and sends them to the computer 40A.

In a case where a plane sensor is used as the sensor, an image is scanned from an edge of the sensor by each line and sent in a state such that the image is divided into pixel lines. Thus, the pixel line can successively be sent before the entire image has been scanned.

In a case where a sensor smaller than a finger is used as the sensor to acquire an image through sweep operation of a finger, pixel lines can be sent successively to the computer 40A before the sweep of the entire finger is completed.

Then the first frequency analysis part 62 in the first frequency analysis unit 42A provided on the computer 40A successively performs one-dimensional frequency analysis on the pixel lines transmitted from the image input device 30A (Step B4).

In this example, when the image is acquired by the fingerprint/palmprint image input device 30A, the pixel lines are successively sent to the computer 40A. However, a buffer (not shown) for temporarily storing pixel lines may be provided in the fingerprint/palmprint image input device 30A. When pixel lines required from the computer 40A are requested to the fingerprint/palmprint image input device 30A, the fingerprint/palmprint image input device 30A may read the required pixel lines from the buffer and send them to the computer 40A.

Operation of a second frequency analysis unit 44 as shown in Step B5, operation of a feature point detection/ridge line restoration unit 46 as shown in Steps B6 and B7, and operation of an arithmetic result output device 50 as shown in Step B8 are the same as the operations of the second frequency analysis unit 44, the feature point detection/ridge line restoration unit 46, and the arithmetic result output device 50 in the embodiment shown in FIG. 1, respectively (Step A5, Steps A6 and A7, and Step A8 in FIG. 4), and explanation thereof is omitted.

In the present embodiment, the image input device 30A such as a fingerprint/palmprint image input device divides an input image (original image) into pixel lines and successively sends them to the computer 40A. Accordingly, the first frequency analysis unit 42A can be operated as soon as the pixel lines are sent to the computer 40A, and operation can be started before the entire image has been inputted.

Specifically, the entire configuration is substantially the same as that in the first embodiment of the present invention described in FIGS. 1 to 4 except that a function of dividing an image into pixel lines is omitted from the first frequency analysis unit 42A but provided in the image input device 30A.

Figure 16:
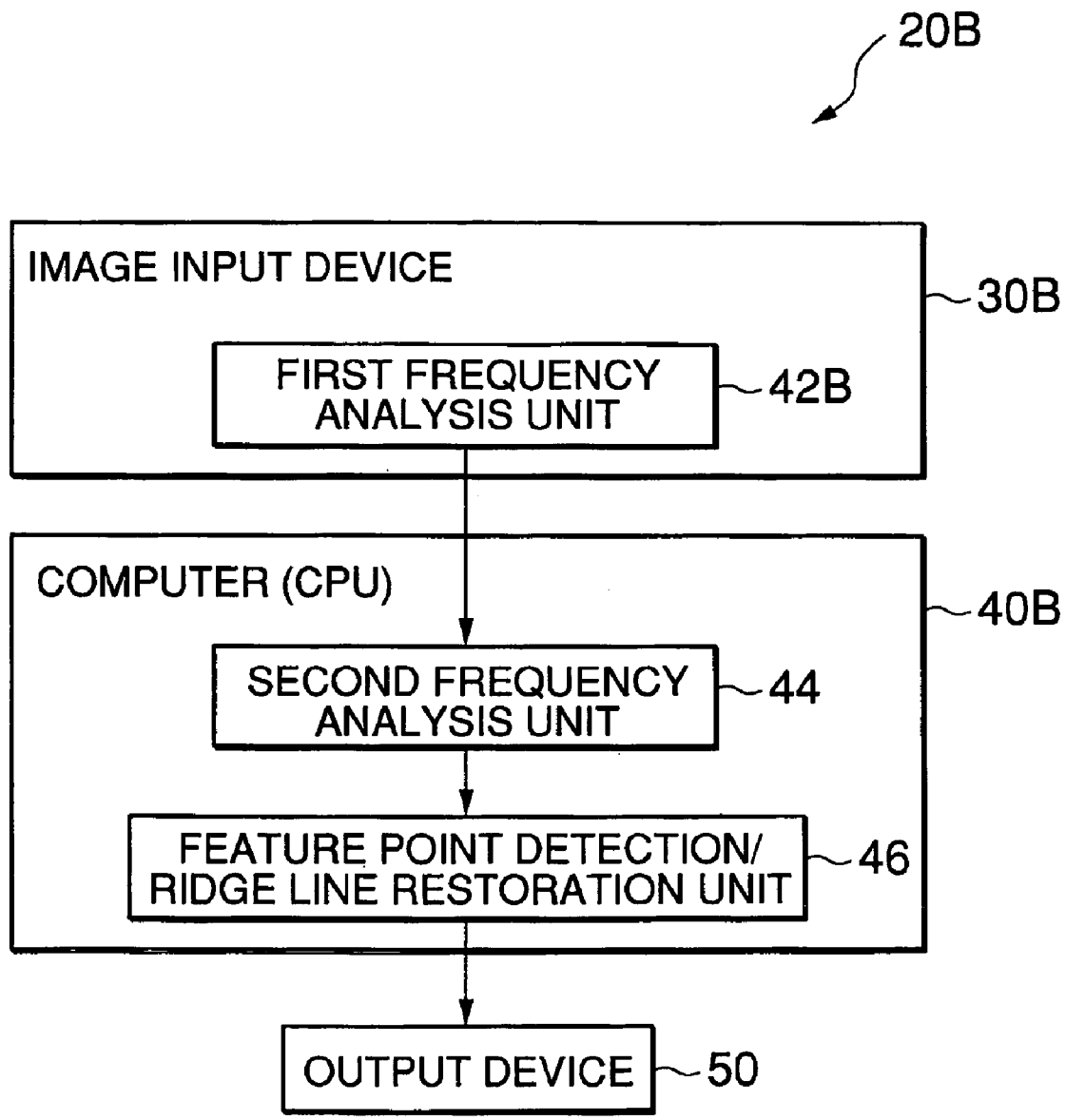
FIG. 16 is a functional block diagram showing an image processing system according to a third embodiment of the present invention in a simplified manner.

Referring to FIG. 16, an image processing system 20B according to a third embodiment of the present invention differs from the image processing system 20A shown in FIG. 11 in operations of an image input device 30B and a computer 40B as described later.

Figure 17:
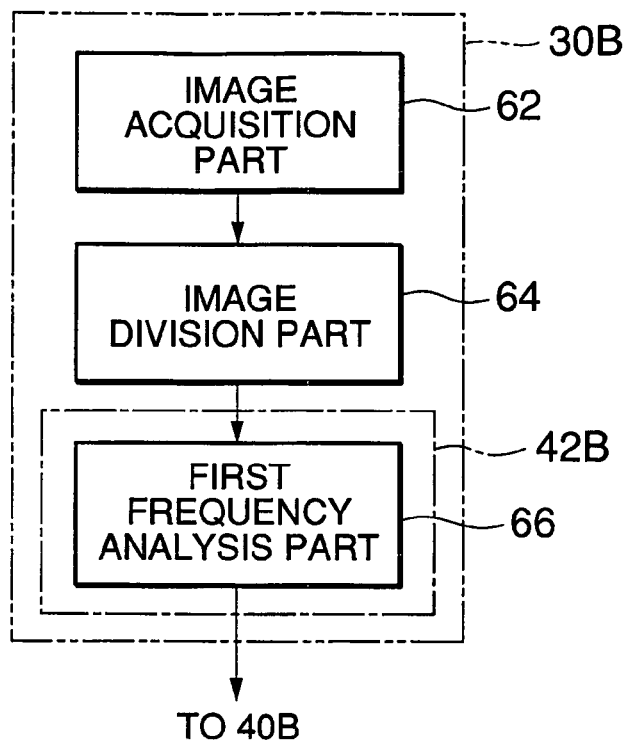
FIG. 17 is a block diagram showing an image input device used in the image processing system shown in FIG. 16.

Referring to FIG. 17, the image input device 30B comprises an image acquisition part 62, and an image division part 64, and a first frequency analysis unit 42B. The first frequency analysis unit 42B comprises a first frequency analysis part 66.

Figure 18:
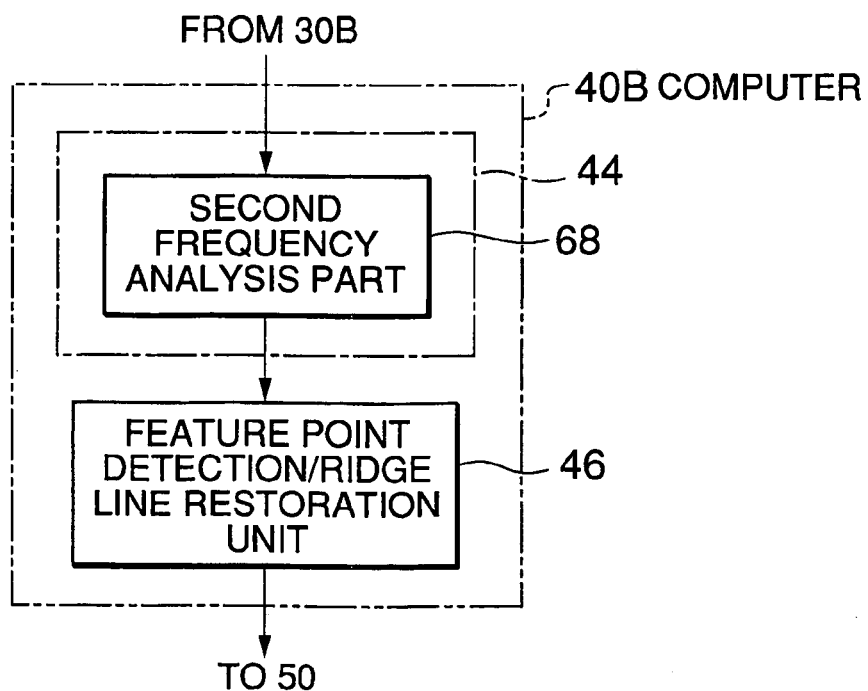
FIG. 18 is a functional block diagram showing a computer used in the image processing system shown in FIG. 16 in a simplified manner.

Referring to FIG. 18, the computer 40B comprises a second frequency analysis unit 44 and a feature point detection/ridge line restoration unit 46. The second frequency analysis unit 44 comprises a second frequency analysis part 68.

Specifically, the first frequency analysis unit 42B is provided in the image input device 30B of the image processing system 20B in addition to a function of dividing an image into pixel lines whereas the first frequency analysis unit is omitted from the computer 40B.

With such a configuration, the image input device 30B extracts pixel lines having a predetermined width from an input image (original image), performs one-dimensional frequency analysis in the first frequency analysis unit 42B, and sends the results of the one-dimensional frequency analysis successively to the computer 40B. The computer 40B obtains a two-dimensional frequency analysis result with use of the results of the one-dimensional frequency analysis, which have been transmitted from the image input device 30B, in the second frequency analysis unit 44, restores ridge lines from the two-dimensional frequency analysis result in the feature point detection/ridge line restoration unit 46, and produces the ridge line restoration result to an arithmetic result output device 50.

Figure 19:
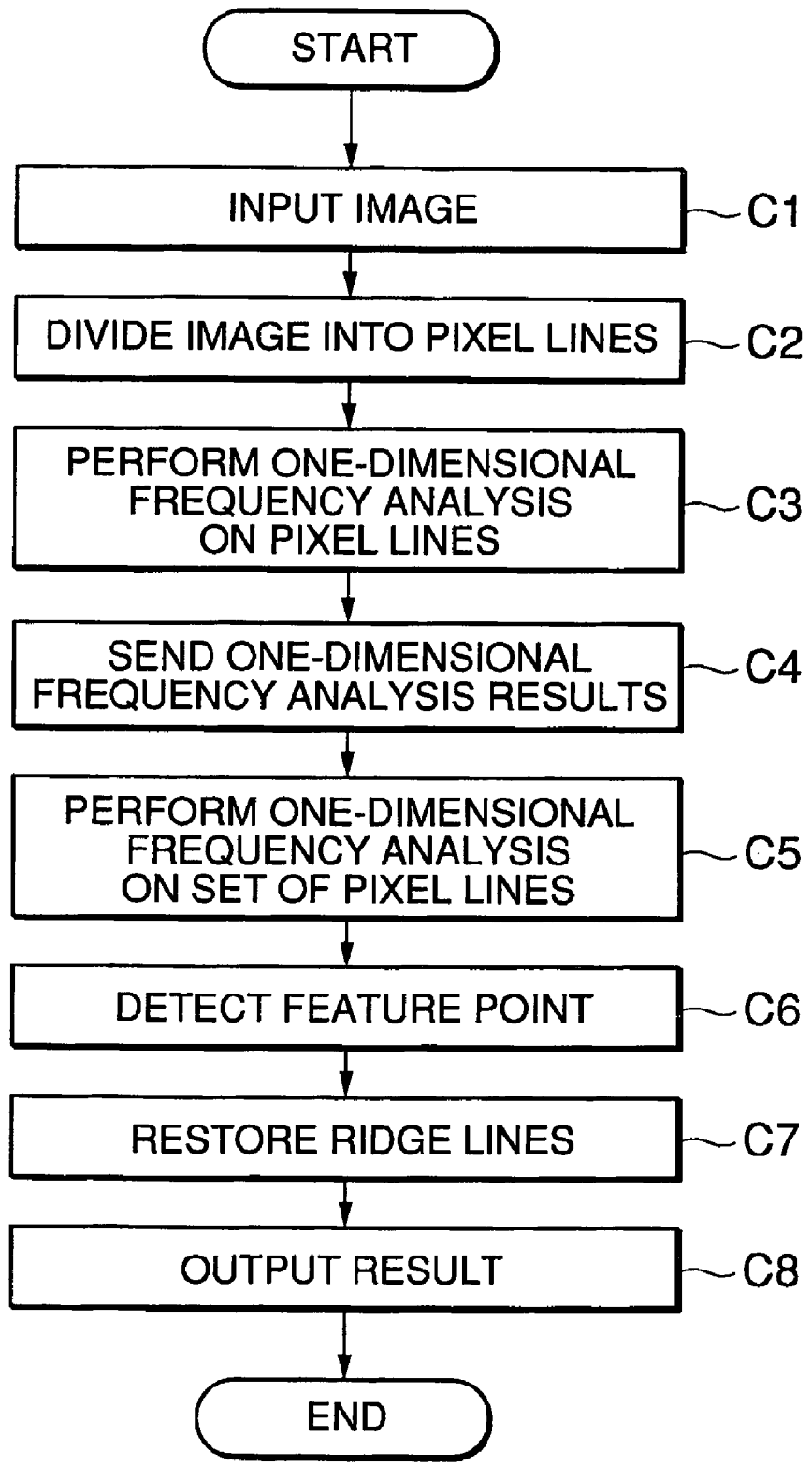
FIG. 19 is a flow chart showing operation of the entire image processing system in the third embodiment.

Next, referring to a flow chart in FIG. 19, operation of the entire image processing system 20B according to the third embodiment of the present invention will be described below.

The image acquisition part 62 of the image input device 30B acquires the original image partially in sequence to produce the partially acquired image sequentially (Step C1). Then the image division part 64 of the image input device 30B divides the partially acquired image into pixel lines having a predetermined width to produce the pixel lines sequentially (Step C2). The first frequency analysis part 66 of the first frequency analysis unit 42B in the image input device 30B performs one-dimensional frequency analysis on the pixel lines (Step C3) and sends the results of the one-dimensional frequency analysis successively to the computer 40B (Step C4).

For example, in a case where the image input device 30B is formed by a fingerprint/palmprint image input device, the fingerprint/palmprint image input device 30B divides an image inputted from a sensor successively into pixel lines having a width of 32 pixels, performs one-dimensional Fourier transform on the pixel lines by the first frequency analysis unit 42B provided in the fingerprint/palmprint image input device 30B, and sends the results of the one-dimensional Fourier transform successively to the computer 40B.

Figure 4:
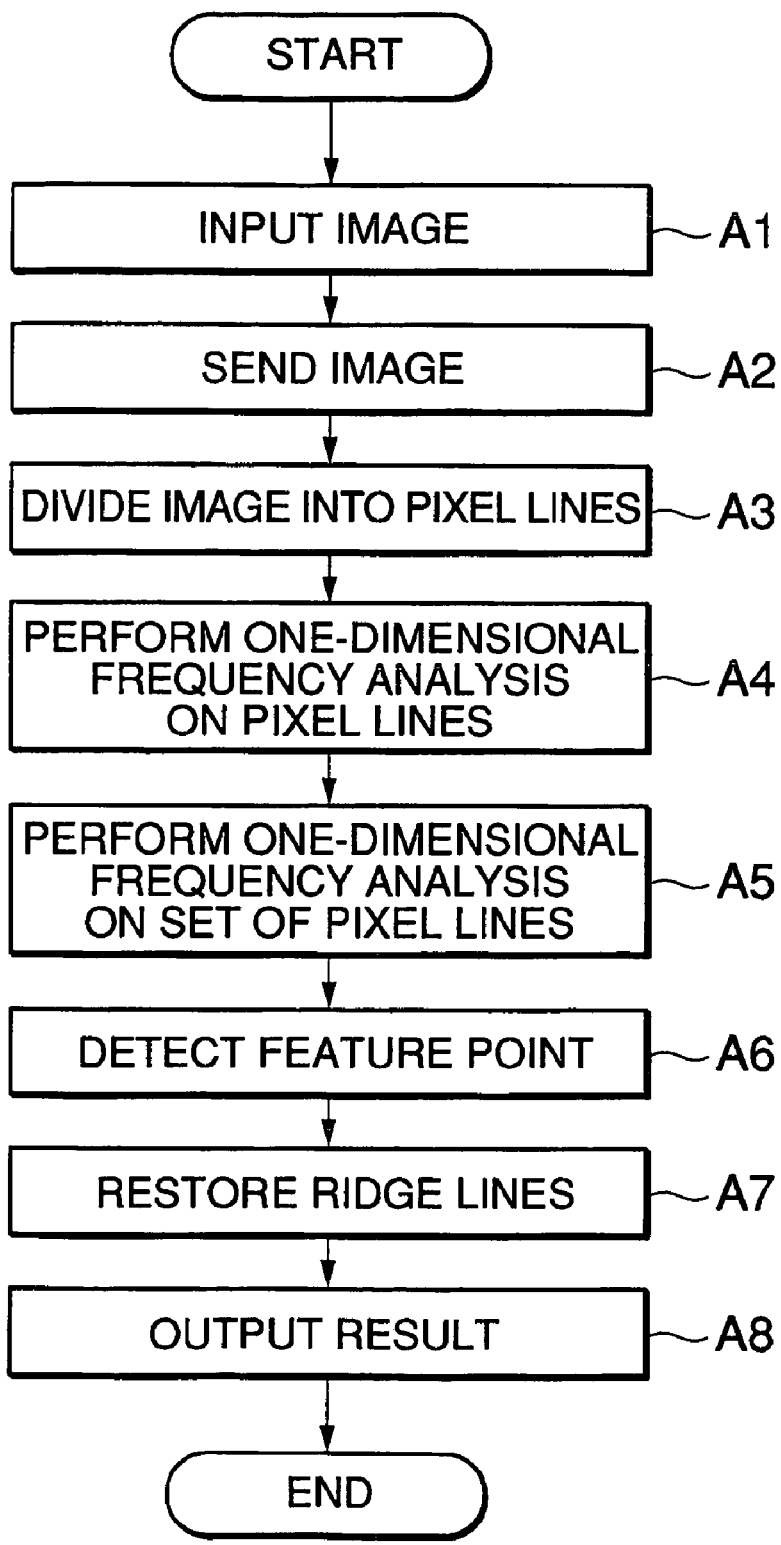
FIG. 4 is a flow chart showing operation of the entire image processing system in the first embodiment.

Operation of the second frequency analysis unit 44 as shown in Step C5, operation of the feature point detection/ridge line restoration unit 46 as shown in Steps C6 and C7, and operation of the arithmetic result output device 50 as shown in Step C8 are the same as the operations of the second frequency analysis unit 44, the feature point detection/ridge line restoration unit 46, and the arithmetic result output device 50 in the embodiment shown in FIG. 1, respectively (Step A5, Steps A6 and A7, and Step A8 in FIG. 4).

Specifically, the computer 40B performs further one-dimensional Fourier transform on the transmitted one-dimensional Fourier transform results in the second frequency analysis unit 44 so as to obtain a two-dimensional Fourier transform result.

In the third embodiment of the present invention, the results of the one-dimensional frequency analysis after division of the input image (original image) into pixel lines are successively sent to the computer 40B. Accordingly, the second frequency analysis unit 44 can be operated as soon as the results of the one-dimensional frequency analysis are sent to the computer 40B, and operation can be started before the entire image has been inputted.

Accordingly, the entire configuration is substantially the same as that in the first embodiment of the present invention described in FIGS. 1 to 4 except that a function of dividing an image into pixel lines and a function of performing one-dimensional frequency analysis on each divided pixel line are provided in the image input device 30B while the first frequency analysis unit is omitted from the computer 40B.

Further, in the third embodiment of the present invention, it is possible to reduce a process of the computer 40B by mounting a microprocessor dedicated for signal processing, such as DSP, on the fingerprint/palmprint image input device 30B and by performing first frequency analysis with the fingerprint/palmprint image input device 30B. For example, in a case where the fingerprint/palmprint image input device 30B is mounted on a device for speech processing, such as a transceiver, it is possible to reduce a process of the computer 40B without addition of any new components, by using a microprocessor dedicated for signal processing in speech processing, which is provided on the transceiver by nature. Further, only the second frequency analysis unit 44 or each of the first frequency analysis unit 42B and the second frequency analysis unit 44 may be formed by an independent microprocessor dedicated for signal processing.

In the first embodiment described at first, the second embodiment, and the third embodiment, it is assumed that the original image to be processed is an image of a fingerprint or a palmprint. However, frequency analysis may be performed on other images. Further, Fourier transform has been described as an example of a frequency analysis method. However, other frequency analysis methods that can separate process in a vertical direction and a horizontal direction, such as Walsh-Hadamard transform, may be employed. That is, it is possible to use other frequency analysis methods in which frequency analysis is performed on each pixel line so as to obtain one-dimensional frequency analysis results of the respective lines and then these one-dimensional frequency analysis results are collectively used to obtain a final two-dimensional frequency analysis result.

Figure 20:
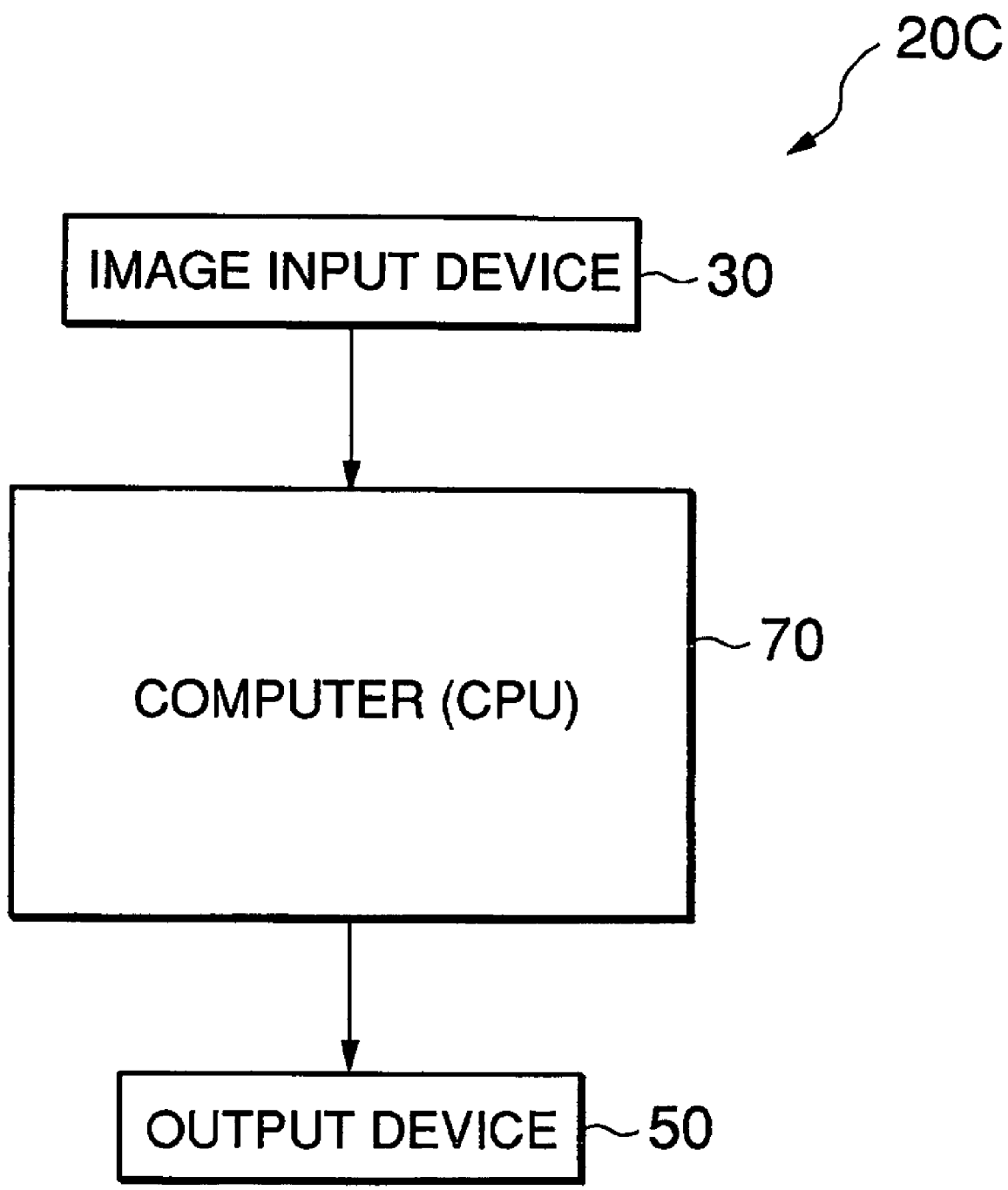
FIG. 20 is a functional block diagram showing an image processing system according to a fourth embodiment of the present invention in a simplified manner.

Next, referring to FIG. 20, an image processing system 20C according to a fourth embodiment of the present invention will briefly be described below.

The image processing system 20C according to the fourth embodiment of the present invention is an image processing system comprising a computer 70 operated by a program, which forms the respective units in the first embodiment (FIG. 1) described at first, the second embodiment (FIG. 12), or the third embodiment (FIG. 16), and an image input device 30.

The program is read into the computer 70 so as to control operation of a CPU of the computer 70. The computer 70 performs the same processes as the processes performed by the computer 40, 40A, or 40B in the first embodiment described at first, the second embodiment, or the third embodiment under control of the image processing program.

Figure 10:
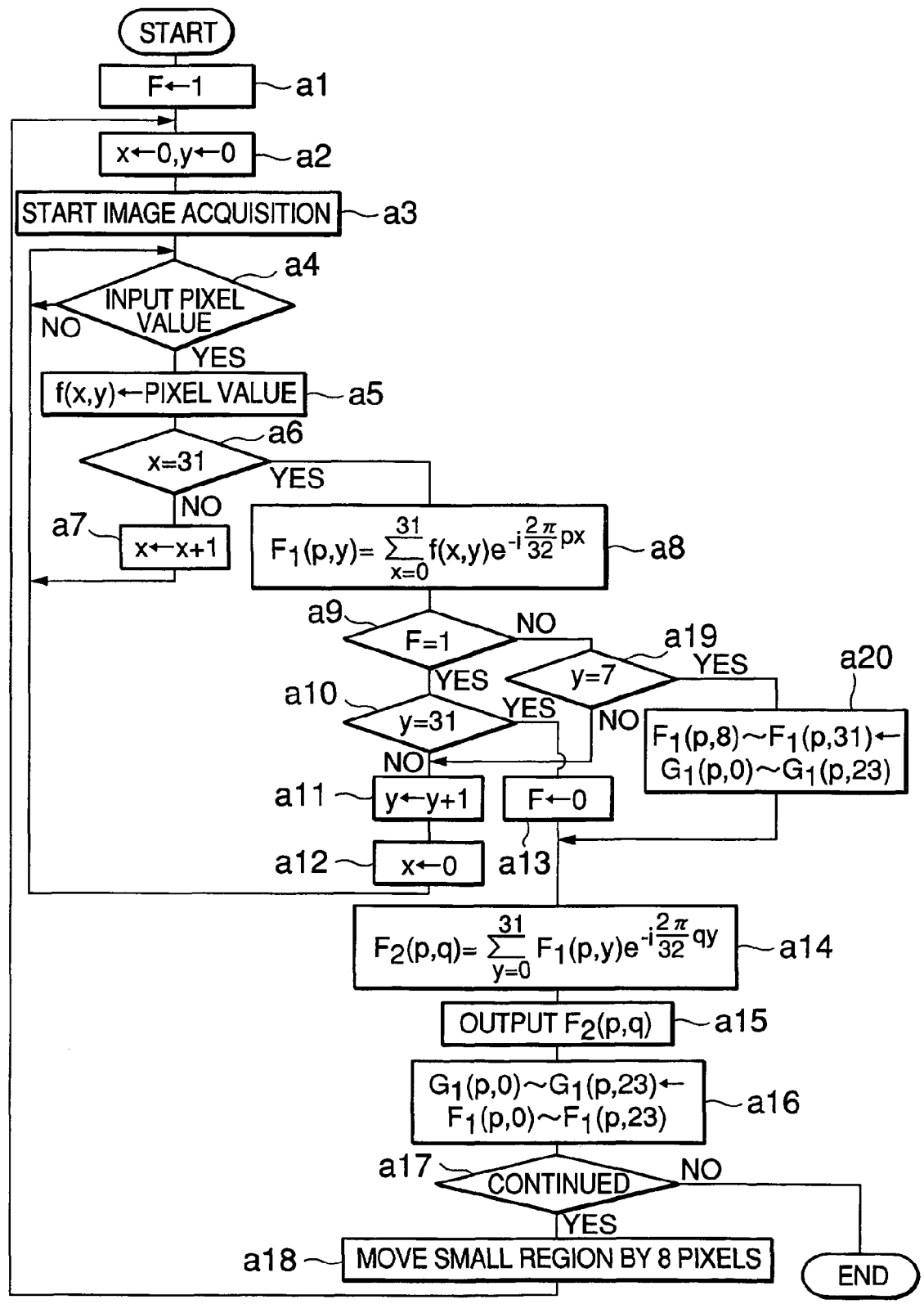
FIG. 10 is a flow chart showing a specific example of a process of a microprocessor in the computer which serves as first and second frequency analysis parts.

For example, in a case where the CPU of the computer 70 implements functions of a first frequency analysis unit for performing a first frequency analysis process and a second frequency analysis unit for performing a second frequency analysis process, for example, the image processing program is as shown in FIG. 10.

The image processing program will be described with the example of FIG. 10. The processes from Step a1 to Step a4 correspond to a function of acquiring an original image partially in sequence to produce the partially acquired image sequentially. The processes from Step a5 to Step a7 correspond to a function of dividing the partially acquired image into pixel lines to sequentially produce the pixel lines. The processes of Steps a8-a12 correspond to a function of performing one-dimensional frequency analysis on each pixel line to sequentially produce the one-dimensional frequency analysis results. In other words, the processes from Step a1 to Step a12 correspond to a first frequency analysis function of dividing the partially acquired image into pixel lines and of performing one-dimensional frequency analysis on each pixel line. Further, the processes from Step a14 to Step a20 correspond to a function of collecting a required number of the one-dimensional frequency analysis results for analysis of a small region to obtain a two-dimensional frequency analysis result of the small region. In other words, the processes subsequent to Step a14 correspond to a second frequency analysis function of collecting the one-dimensional frequency analysis results obtained by the first frequency analysis, which are required for analysis of a small region, and of obtaining a two-dimensional frequency analysis result of the small region.

As described above, there is a variation in which a first frequency analysis function of performing one-dimensional frequency analysis on each pixel line is provided in the image input device 30. It is technically easy to divide the program and incorporate the divided programs into the computer 70 and the image input device 30.

INDUSTRIAL APPLICABILITY

An image processing system according to the present invention can be applied to a fingerprint/palmprint authentication device for identifying a person and a program for implementing a fingerprint/palmprint authentication device with a computer when the image processing system is used for frequency analysis of a fingerprint/palmprint image. Further, the image processing system can be applied to a fingerprint/palmprint database registration device and a program for implementing a fingerprint/palmprint database device with a computer.

The invention claimed is:

1. An image processing system for dividing an original image into small regions and performing frequency analysis on each small region, said image processing system comprising:

an image acquisition part for acquiring the original image partially in sequence to produce the partially acquired image sequentially before the original image is entirely acquired;

an image division part for dividing the partially acquired image into pixel lines and sequentially producing the pixel lines;

a first frequency analysis part for performing one-dimensional frequency analysis on each pixel line so as to sequentially obtain one-dimensional frequency analysis results; and a second frequency analysis part for collecting the one-dimensional frequency analysis results required for analysis of the small region to obtain a two-dimensional frequency analysis result of the small region without waiting for the original image to be entirely acquired;

wherein the image processing system comprises an image input device, a first frequency analysis unit, and a second frequency analysis unit, the image input device comprising the image acquisition part, the first frequency analysis unit comprising the image division part and the first frequency analysis part, and the second frequency analysis unit comprising the second frequency analysis part.

2. An image processing system for dividing an original image into small regions and performing frequency analysis on each small region, said image processing system comprising:

an image acquisition part for acquiring the original image partially in sequence to produce the partially acquired image sequentially before the original image is entirely acquired;

an image division part for dividing the partially acquired image into pixel lines and sequentially producing the pixel lines;

a first frequency analysis part for performing one-dimensional frequency analysis on each pixel line so as to sequentially obtain one-dimensional frequency analysis results; and a second frequency analysis part for collecting the one-dimensional frequency analysis results required for analysis of the small region to obtain a two-dimensional frequency analysis result of the small region without waiting for the original image to be entirely acquired;

wherein the image processing system comprises an image input device, a first frequency analysis unit, and a second frequency analysis unit, the image input device comprising the image acquisition part and the image division part, the first frequency analysis unit comprising the first frequency analysis part, and the second frequency analysis unit comprising the second frequency analysis part.

3. An image processing system for dividing an original image into small regions and performing frequency analysis on each small region, said image processing system comprising:

an image acquisition part for acquiring the original image partially in sequence to produce the partially acquired image sequentially before the original image is entirely acquired;

an image division part for dividing the partially acquired image into pixel lines and sequentially producing the pixel lines;

a first frequency analysis part for performing one-dimensional frequency analysis on each pixel line so as to sequentially obtain one-dimensional frequency analysis results; and a second frequency analysis part for collecting the one-dimensional frequency analysis results required for analysis of the small region to obtain a two-dimensional frequency analysis result of the small region without waiting for the original image to be entirely acquired;

wherein the image processing system comprises an image input device and a frequency analysis unit, the image input device comprising the image acquisition part, the image division part, and the first frequency analysis part, and the frequency analysis unit comprising the second frequency analysis part.

4. The image processing system as claimed in claim 1, wherein the first frequency analysis part comprises a first Fourier transformer for performing one-dimensional Fourier transform on each divided pixel line so as to sequentially obtain one-dimensional Fourier transform results as the one-dimensional frequency analysis results, wherein the second frequency analysis part comprising a second Fourier transformer for collecting the one-dimensional Fourier transform results and performing further one-dimensional Fourier transform so as to obtain a two-dimensional Fourier transform result as the two-dimensional frequency analysis result of the small region.

5. The image processing system as claimed in claim 1, wherein the second frequency analysis part repeatedly performs frequency analysis of the small region on a wider area including the small region, and the second frequency analysis part repeatedly uses one-dimensional frequency analysis results that have previously been obtained by the first frequency analysis part in two-dimensional frequency analysis for a second or further time.

6. The image processing system as claimed in claim 1, wherein the image acquisition part acquires an image of a fingerprint or a palmprint as the original image.

7. The image processing system as claimed in claim 6, further comprising a feature point detection/ridge line restoring unit for detecting a vicinity of a feature point in the fingerprint or the palmprint from the two-dimensional frequency analysis result and for restoring only a ridge line near the feature point.

8. The image processing system as claimed in claim 1, wherein at least one of the first and second frequency analysis parts performs frequency analysis with use of a microprocessor dedicated for signal processing.

9. An image processing method of dividing an original image into small regions and of performing frequency analysis on each small region, said method comprising:

using a computer/processor to perform the steps of:
    acquiring the original image partially in sequence to produce the partially acquired image sequentially before the original image is entirely acquired;
    dividing the partially acquired image into pixel lines and sequentially producing the pixel lines;
    performing one-dimensional frequency analysis on each pixel line so as to sequentially obtain one-dimensional frequency analysis results; and
    collecting the one-dimensional frequency analysis results required for analysis of the small region to obtain a two-dimensional frequency analysis result of the small region without waiting for the original image to be entirely acquired.

10. The image processing method as claimed in claim 9, wherein the step of performing one-dimensional frequency analysis performs one-dimensional Fourier transform on each pixel line to produce one-dimensional Fourier transform results, and the step of obtaining a two-dimensional frequency analysis result of the small region collecting the one-dimensional Fourier transform results and performing further one-dimensional Fourier transform so as to obtain a two-dimensional Fourier transform result of the small region.

11. The image processing method as claimed in claim 9, wherein the step of obtaining a two-dimensional frequency analysis result of the small region repeatedly performs frequency analysis of the small region on a wider area including the small region, and the step of obtaining a two-dimensional frequency analysis result of the small region repeatedly using one-dimensional frequency analysis results that have previously been obtained in the step of performing the one-dimensional frequency analysis in two-dimensional frequency analysis for a second or further time.

12. The image processing method as claimed in claim 9, wherein the step of acquiring the original image acquires an image of a fingerprint or a palmprint as the original image.

13. The image processing method as claimed in claim 12, further comprising the steps of detecting a vicinity of a feature point in the fingerprint or the palmprint from the two-dimensional frequency analysis result, and of restoring only a ridge line near the feature point.

14. A non-transitory computer readable medium storing an image processing software program for implementing functions with a microprocessor mounted on an image processing system for dividing an original image into small regions and for performing frequency analysis on each small region, the functions including:

a function of acquiring the original image partially in sequence to produce the partially acquired image sequentially before the original image is entirely acquired;
    a function of dividing the partially acquired image into pixel lines and sequentially producing the pixel lines;
    a function of performing one-dimensional frequency analysis on each pixel line so as to sequentially obtain one-dimensional frequency analysis results; and
    a function of collecting the one-dimensional frequency analysis results required for analysis of the small region to obtain a two-dimensional frequency analysis result of the small region without waiting for the original image to be entirely acquired.

15. The computer readable medium as claimed in claim 14, wherein the function of performing one-dimensional frequency analysis performs one-dimensional Fourier transform on each pixel line to produce one-dimensional Fourier transform results, and the function of obtaining a two-dimensional frequency analysis result of the small region collecting the one-dimensional Fourier transform results and performing further one-dimensional Fourier transform so as to obtain a two-dimensional Fourier transform result of the small region.

16. The computer readable medium as claimed in claim 14, wherein the function of obtaining a two-dimensional frequency analysis result of the small region repeatedly performs frequency analysis of the small region on a wider area including the small region, and the function of obtaining a two-dimensional frequency analysis result of the small region repeatedly using one-dimensional frequency analysis results that have previously been obtained by the function of performing the one-dimensional frequency analysis in two-dimensional frequency analysis for a second or further time.

17. The computer readable medium as claimed in claim 14, wherein the function of acquiring the original image acquires an image of a fingerprint or a palmprint as the original image.

18. The computer readable medium as claimed in claim 17, implementing further functions with the microprocessor, the further functions including:

a function of detecting a vicinity of a feature point in the fingerprint or the palmprint from the two-dimensional frequency analysis result; and a function of restoring only a ridge line near the feature point.

19. An image processing method of dividing an original image into small regions and of performing frequency analysis on each small region, said method comprising:

using a computer/processor to perform the steps of:
acquiring the original image partially in sequence to produce the partially acquired image sequentially;
dividing the partially acquired image into pixel lines and sequentially producing the pixel lines;
performing one-dimensional frequency analysis on each pixel line so as to sequentially obtain one-dimensional frequency analysis results; and
collecting the one-dimensional frequency analysis results required for analysis of the small region to obtain a two-dimensional frequency analysis result of the small region;
the step of obtaining the two-dimensional frequency analysis result of the small region repeatedly performing the frequency analysis of the small region on a wider area including the small region, the step of obtaining the two-dimensional frequency analysis result of the small region repeatedly using, in a second or a subsequent two-dimensional frequency analysis, the one-dimensional frequency analysis results previously obtained in the step of performing the one-dimensional analysis.

20. The image processing method as claimed in claim 19, wherein:
the step of acquiring the original image acquires an image of a fingerprint or a palmprint as the original image;
the image processing method further comprising the steps of detecting a vicinity of a feature point in the fingerprint or the palmprint from the two-dimensional frequency analysis result and of restoring only a ridge line near the feature point.

21. A non-transitory computer readable medium storing an image processing program software for making a microprocessor, which is equipped in an image processing system for dividing an original image into small regions and for performing frequency analysis on each small region, realize the functions of:
acquiring the original image partially in sequence to produce the partially acquired image sequentially;
dividing the partially acquired image into pixel lines and sequentially producing the pixel lines;
performing one-dimensional frequency analysis on each pixel line so as to sequentially obtain one-dimensional frequency analysis results; and
collecting the one-dimensional frequency analysis results required for analysis of the small region to obtain a two-dimensional frequency analysis result of the small region;
the function of obtaining the two-dimensional frequency analysis result of the small region repeatedly performing the frequency analysis of the small region on a wider area including the small region, the function of obtaining the two-dimensional frequency analysis result of the small region repeatedly using, in a second or a subsequent two-dimensional frequency analysis, the one-dimensional frequency analysis results previously obtained by the function of performing the one-dimensional analysis.

22. The computer readable medium as claimed in claim 21, wherein:
the function of acquiring the original image acquires an image of a fingerprint or a palmprint as the original image;
the image processing program software making the microprocessor further realize a function of detecting a vicinity of a feature point in the fingerprint or the palmprint from the two-dimensional frequency analysis result and a function of restoring only a ridge line near the feature point.

* * * * *